United States Patent
Nolan et al.

(10) Patent No.: US 11,477,430 B2
(45) Date of Patent: Oct. 18, 2022

(54) METHODS FOR CONTROLLING SCENE, CAMERA AND VIEWING PARAMETERS FOR ALTERING PERCEPTION OF 3D IMAGERY

(71) Applicant: WARNER BROS. ENTERTAINMENT INC., Burbank, CA (US)

(72) Inventors: Christopher E. Nolan, Los Angeles, CA (US); Bradley T. Collar, Valencia, CA (US); Michael D. Smith, Hermosa Beach, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 17/021,499

(22) Filed: Sep. 15, 2020

(65) Prior Publication Data

US 2021/0076022 A1 Mar. 11, 2021

Related U.S. Application Data

(63) Continuation of application No. 16/370,067, filed on Mar. 29, 2019, now Pat. No. 10,778,955, which is a
(Continued)

(51) Int. Cl.
*H04N 19/70* (2014.01)
*H04N 19/119* (2014.01)
(Continued)

(52) U.S. Cl.
CPC ......... *H04N 13/189* (2018.05); *H04N 13/128* (2018.05); *H04N 13/204* (2018.05); *H04N 13/275* (2018.05)

(58) Field of Classification Search
None
See application file for complete search history.

(56) References Cited

U.S. PATENT DOCUMENTS 5,065,236 A * 11/1991 Diner .................. G02B 30/22
348/54
5,835,133 A 11/1998 Moreton et al.
(Continued)

OTHER PUBLICATIONS

Yang, "Geometric Models in Stereoscopic Video," Rapport technique de' INRS—Telecommunications No. 95-12, 1995, pp. 1-22. (Year: 1995).*

Hill, "A Mathematical and Experimental Foundation for Stereoscopic Photography," The Society of Motion Picture and Television Engineers Motion Imaging Journal (SMPTE), vol. 61, 1953, pp. 461-486. (Year: 1953).

(Continued)

*Primary Examiner* — Christopher Braniff
(74) *Attorney, Agent, or Firm* — One LLP; Jonathan Jaech

(57) ABSTRACT

Mathematical relationships between the scene geometry, camera parameters, and viewing environment are used to control stereography to obtain various results influencing the viewer's perception of 3D imagery. The methods may include setting a horizontal shift, convergence distance, and camera interaxial parameter to achieve various effects. The methods may be implemented in a computer-implemented tool for interactively modifying scene parameters during a 2D-to-3D conversion process, which may then trigger the re-rendering of the 3D content on the fly.

20 Claims, 33 Drawing Sheets

Related U.S. Application Data continuation of application No. 15/368,456, filed on Dec. 2, 2016, now Pat. No. 10,277,883, which is a continuation of application No. 13/482,953, filed on May 9, 2012, now Pat. No. 9,532,027.

(60) Provisional application No. 61/533,777, filed on Sep. 12, 2011, provisional application No. 61/491,157, filed on May 27, 2011.

(51) Int. Cl.
| | | |
|---|---|---|
| *H04N 19/124* | (2014.01) | |
| *H04N 19/52* | (2014.01) | |
| *H04N 13/189* | (2018.01) | |
| *H04N 13/275* | (2018.01) | |
| *H04N 13/204* | (2018.01) | |
| *H04N 13/128* | (2018.01) | |

(56) References Cited

U.S. PATENT DOCUMENTS

| | | |
|---|---|---|
| 2005/0089212 A1 | 4/2005 | Mashitani et al. |
| 2007/0248260 A1 | 10/2007 | Pockett |
| 2008/0129032 A1 | 6/2008 | Conrad et al. |
| 2010/0099492 A1* | 4/2010 | Kamiya ............ A63F 13/10 463/30 |
| 2010/0318914 A1 | 12/2010 | Ziknick, III et al. |

OTHER PUBLICATIONS

Woods et al., "Image Distortions in Stereoscopic Video Systems," Proceedings of the SPIE vol. 1915, Steroscopic Displays and Applications IV, Feb. 1993.

Yang, "Geometric Modes in Stereoscopic Video," Rapport technique de l'INRS—Telecommunications No. 95-12, 1225, pp. 1-22. (Year: 1995).

* cited by examiner

| Shape Ratio = 1 (Perfect Reproduction) | Shape Ratio < 1 (Compaction) | Shape Ratio > 1 (Elongation) |
|---|---|---|
| 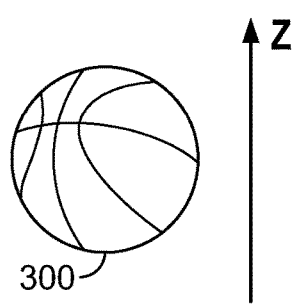 | 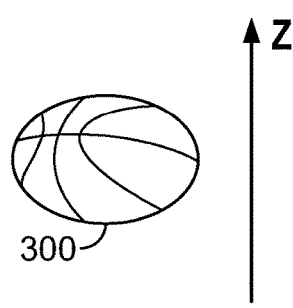 | 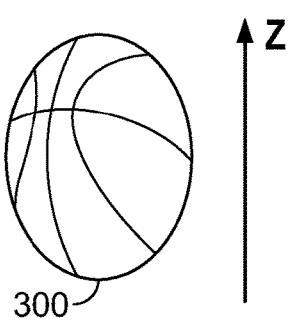 |
FIG. 3A
| 3D Width Magnification = 1 (Accurate/True Size) | 3D Width Magnification < 1 (Miniature Size) | 3D Width Magnification > 1 (Gigantic Size) |
|---|---|---|
| 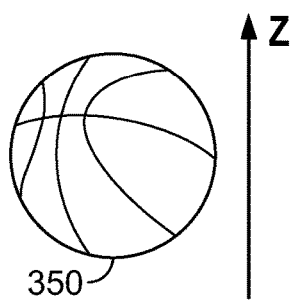 | 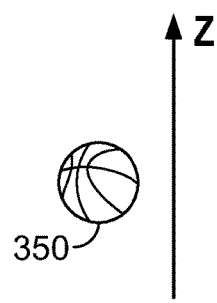 | 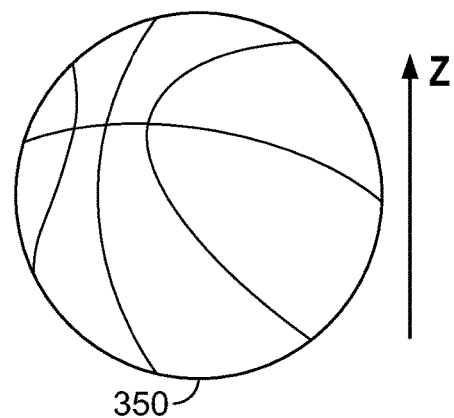 |
FIG. 3B

| | | New Screen Size | | | | | | | | | | |
|---|---|---|---|---|---|---|---|---|---|---|---|---|
| | | 3.5in | 10in | 14in | 24in | 32in | 46in | 65in | 100in | 20 ft | 30 ft | 40 ft | 60 ft |
| | Ws (mm) | 77 | 223 | 309 | 530 | 707 | 1017 | 1436 | 2210 | 6096 | 9144 | 12192 | 18288 |
| Original Screen Size | 24 in diag. 530 | 35.9% | 8.4% | 4.4% | 0.0% | -0.5% | -2.9% | -3.9% | -4.7% | -5.6% | -5.8% | -5.9% | -6.0% |
| | 32 in diag 707 | 37.4% | 10.0% | 5.9% | 1.5% | 0.0% | -1.4% | -2.3% | -3.1% | -4.1% | -4.2% | -4.3% | -4.4% |
| | 46 in diag 1071 | 38.8% | 11.4% | 7.3% | 2.9% | 1.4% | 0.0% | -0.9% | -1.7% | -2.7% | -2.8% | -2.9% | -3.0% |
| | 65 in diag 1436 | 39.8% | 12.3% | 8.2% | 3.9% | 2.3% | 0.9% | 0.0% | -0.8% | -1.7% | -1.9% | -2.0% | -2.1% |
| | 100 in diag 2210 | 40.6% | 13.1% | 9.0% | 4.7% | 3.1% | 1.7% | 0.8% | 0.0% | -0.9% | -1.1% | -1.2% | -1.3% |
| | 20 ft Wide 6096 | 41.5% | 14.0% | 10.1% | 5.6% | 4.1% | 2.7% | 1.7% | 0.9% | 0.0% | -0.2% | -0.3% | -0.4% |
| | 30 ft Wide 9144 | 41.7% | 14.2% | 10.2% | 5.8% | 4.2% | 2.8% | 1.9% | 1.1% | 0.2% | 0.0% | -0.1% | -0.2% |
| | 40 ft Wide 12192 | 41.8% | 14.3% | 10.2% | 5.9% | 4.3% | 2.9% | 2.0% | 1.2% | 0.3% | 0.1% | 0.0% | -0.1% |
| | 60 ft Wide 18288 | 41.8% | 14.4% | 10.3% | 6.0% | 4.4% | 3.0% | 2.1% | 1.3% | 0.4% | 0.2% | 0.1% | 0.0% |

FIG. 11

| Object | $W_o$ (mm) | $Z_o$ (mm) | Method-1 $Z_i$ (mm) | Method-2 $Z_i$ (mm) | Method-4 $Z_i$ (mm) | Method-1 $W_{i3D}$ (mm) | Method-2 $W_{i3D}$ (mm) | Method-4 $W_{i3D}$ (mm) |
|---|---|---|---|---|---|---|---|---|
| Middle of Chair | 500 | 1,250 | 7,209 | 6,343 | 2,022 | 3,916 | 3,445 | 1,098 |
| Front of Actor's Head | 152 | 1,900 | 10,957 | 10,748 | 8,139 | 1,190 | 1,168 | 884 |
| Back of Actor's Head | 152 | 2,100 | 12,111 | 12,314 | 18,251 | 1,190 | 1,210 | 1,794 |
| Middle of Desk | 1,000 | 3,250 | 18,743 | 24,136 | Diverge | 7,831 | 10,085 | n/a |
| Back Wall | 4,000 | 4,000 | 23,068 | 35,955 | Diverge | 31,325 | 48,824 | n/a |

| Object | $W_o$ (mm) | $Z_o$ (mm) | $Z_i$ (mm) for Method | | | | $W_{i3D}$ (mm) for Method | | | |
|---|---|---|---|---|---|---|---|---|---|---|
| | | | 1 $Z_i$ | 2 $Z_i$ | 3a $Z_i$ | 3b $Z_i$ | 4 $Z_i$ | 1 $W_{i3D}$ | 2 $W_{i3D}$ | 3a $W_{i3D}$ | 3b $W_{i3D}$ | 4 $W_{i3D}$ |
| Middle of Chair | 500 | 1,250 | 1,143 | 1,092 | 1,222 | 1,299 | 1,131 | 514 | 491 | 550 | 584 | 509 |
| Front of Actor's Head | 152 | 1,900 | 1,738 | 1,726 | 1,720 | 1,739 | 1,735 | 156 | 155 | 155 | 156 | 156 |
| Back of Actor's Head | 152 | 2,100 | 1,921 | 1,932 | 1,859 | 1,854 | 1,923 | 156 | 157 | 151 | 151 | 157 |
| Middle of Desk | 1,000 | 3,250 | 2,973 | 3,221 | 2,549 | 2,384 | 3,026 | 1,028 | 1,114 | 882 | 825 | 1,047 |
| Back Wall | 4,000 | 4,000 | 3,659 | 4,176 | 2,920 | 2,642 | 3,765 | 4,114 | 4,695 | 3,284 | 2,970 | 4,233 |

| Category | Horizontal Image Shift h | 3D Width Magnification | Shape Ratio |
|---|---|---|---|
| A | Equal to e/2M | Equal to e/t for all $Z_O$ | Equal to V/(Mf) for all $Z_O$ |
| B | Greater than e/2M | Equal to e/t at $Z_O=0$ and increases as object distance $Z_O$ increases. This indicates that objects appear to get larger as they move away from the camera and appear to get smaller as they move towards the camera. | Equal to V/(Mf) at $Z_O=0$ and increases as object distance $Z_O$ increases. This indicates that objects get more elongated as they move away from the camera and more compacted as they move towards the camera. |
| C | Less than e/2M | Equal to e/t at $Z_O=0$ and decreases as object distance $Z_O$ increases. This indicates that objects appear to get smaller as they move away from the camera and appear to get larger as the move towards the camera. | Equal to V/(Mf) at $Z_O=0$ and decreases as object distance $Z_O$ increases. This indicates that objects get more compacted as they move away from the camera and more elongated as they move towards the camera. |

FIG. 30

METHODS FOR CONTROLLING SCENE, CAMERA AND VIEWING PARAMETERS FOR ALTERING PERCEPTION OF 3D IMAGERY

CROSS-REFERENCE TO RELATED APPLICATIONS

This application is a continuation of U.S. patent application Ser. No. 16/370,067, filed Mar. 29, 2019, which is a continuation of U.S. patent application Ser. No. 15/368,456 filed Dec. 2, 2016, now U.S. Pat. No. 10,277,883, which is a continuation of U.S. patent application Ser. No. 13/482,953 filed May 29, 2012, now U.S. Pat. No. 9,532,027, which claims priority under 35 U.S.C. § 119(e) to U.S. Provisional Application Ser. No. 61/533,777 filed Sep. 12, 2011 and 61/491,157, filed May 27, 2011. Each of the aforementioned applications is specifically incorporated herein by reference in its entirety.

FIELD

The present disclosure relates generally to methods, tools, and apparatus for stereography.

BACKGROUND

Stereoscopic three-dimensional entertainment content ("3D content") creation and distribution has dramatically increased in recent years. Various technical and creative methods are employed to produce 3D content, which from a viewer's subjective point of view may be enjoyable. To produce 3D content that meets the creative intent of the film maker, however, stereographers utilize a varied mix of creative and technical methods. In many instances, stereographers apply their methods in an iterative, subjective fashion to obtain results of acceptable quality. Accordingly, many in the film industry still consider the production of 3D content to be a "black art" form. In other words, an art form that fails to apply precise rules governing how 3D content is acquired, transformed, and ultimately perceived by a viewer to obtain predictable and repeatable results, relying instead on trial and error and subjective adjustments, which may be both time consuming and produce results of less than consistent quality. It would be desirable, therefore, to overcome these and other limitations of 3D content creation to more reliably and efficiently achieve results of consistently high quality.

SUMMARY

Methods, tools, and apparatuses for stereography, which apply mathematical relationships between scene geometry, camera parameters, and viewing environments defined in a computer memory, may be used to influence a viewer's perception of 3D imagery output from a video or movie production process. These methods may include, among other things, defining perception values applied in computer-implemented image processing that may comprise a shape ratio and a width magnification factor for a result of a stereographic image generating process. This may be achieved, for example, in response to user input, where the perception values are based at least in part on an assumed viewing environment.

Methods for stereography may also include selecting mathematical algorithms to determine input parameters of a stereographic image generating process, in response to perception values. In this step, the method may include capturing images of a real (physical) set using a stereographic camera rig, for example. Additional steps of methods for stereography may include generating a result using a stereographic image generating process and the input parameters; configuring a pair of cameras for imaging a real set according to horizontal shift and camera interaxial distance; and configuring virtual camera parameters in a modeled environment according to horizontal shift and camera interaxial distance.

In another aspect, these methods may be implemented in a computer-implemented tool, e.g. computer-readable medium, for interactively modifying scene parameters during a two-dimensional to three-dimensional ("2D-to-3D") conversion process, which may then trigger re-rendering of 3D content on the fly. Moreover, an apparatus may also perform the methods described herein. In one embodiment, the apparatus comprises a processor, coupled to a user interface and to a memory, where the memory holds program instructions. The program instructions may include methods that apply mathematical relationships between scene geometry, camera parameters, viewing environments, etc.

A more complete understanding of the methods, tools, and apparatuses for stereography disclosed herein will be afforded to those skilled in the art, as well as a realization of additional advantages and objects thereof, by consideration of the following detailed description. Reference will be made to the appended sheets of drawings which will first be described briefly.

BRIEF DESCRIPTION OF THE DRAWINGS

The drawings described herein are for illustrative purposes only and are not intended to limit the scope of the present disclosure.

FIGS. 3A-3B illustrate the effects of shape ratios and width magnification on a subject.

FIG. 11 shows a data table of suggested Horizontal Image Translation (HIT) change values expressed as a percentage of screen width for various display sizes.

FIG. 19B shows a data table of distance values to the image of the object ($Z_i$) and the 3D Image Width (Wi3D) for several points in the scene used by Example-1 for the Method-1, Method-2 and Method-4.

FIG. 24 shows a graph of $X_i$ vs. $Z_i$ for Example-2 using Method-3a.

FIG. 29 is a table further illustrating results of the methods disclosed herein.

FIG. 30 is a table illustrating a correlation of the dependence of the 3D Width Magnification and Shape Ratio on the object distance Zo for given values of the horizontal image shift h.

DETAILED DESCRIPTION

Before turning in detail to the drawings, as used herein, variables have units of length, unless otherwise noted. In addition, parallel cameras are considered one of the primary apparatus used to acquire or render 3D content, vertical symmetry is considered to exist between a stereoscopic image pair, and no monocular depth cues (e.g. motion parallax, shading) are considered to conflict with depth cues because of stereopsis.

From Object Space to Image Space

Figure 1:
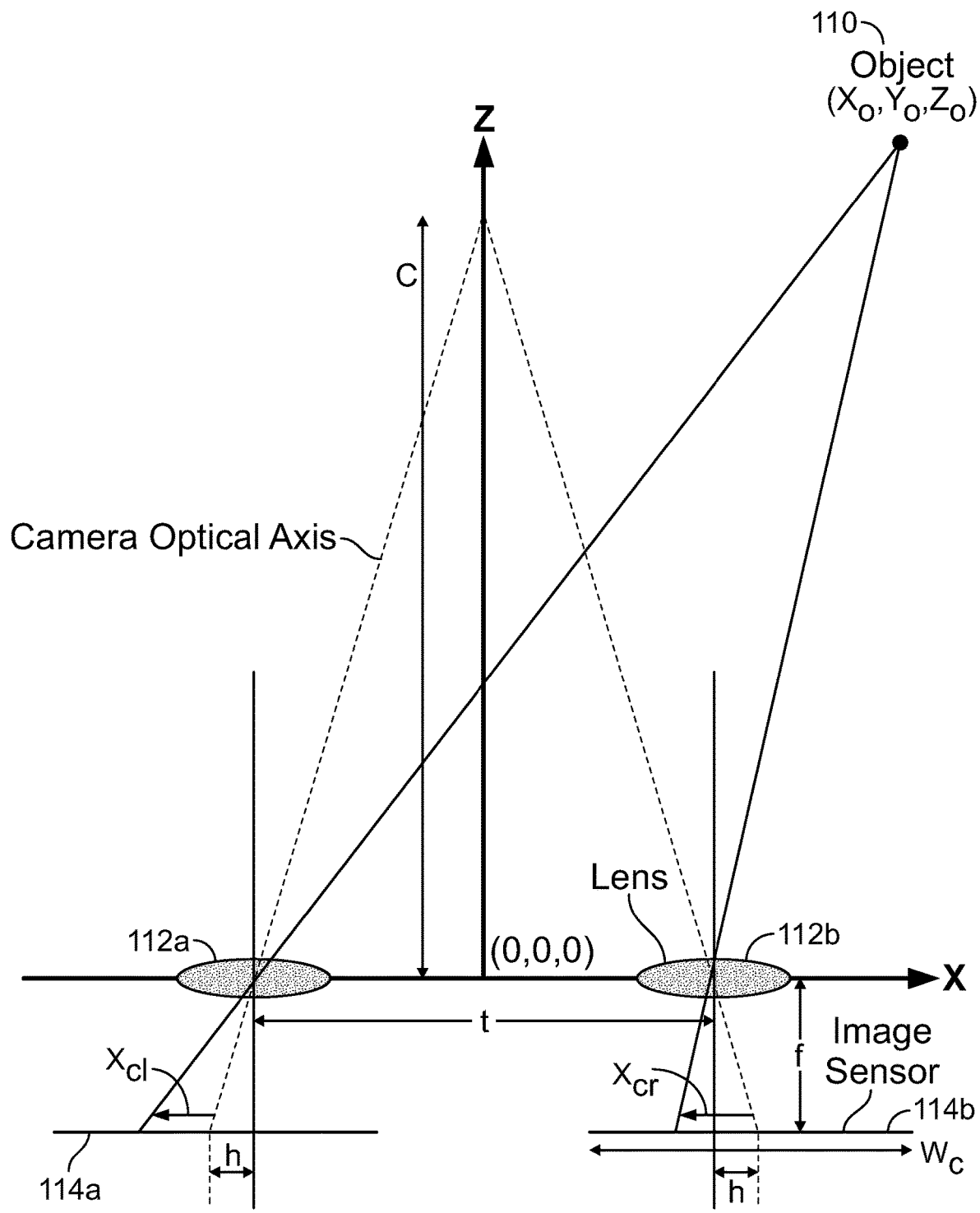
FIG. 1 shows an object in 3D space in relation to a 3D camera.

FIG. 1 shows an object 110 in 3D space in relation to a stereoscopic camera, where the origin of the coordinate system (X=0, Y=0, Z=0) is the midpoint between two parallel camera lenses—a right camera lens 112a and a left camera lens 112b. In this coordinate system, the object 10 has coordinates ($X_o$, $Y_o$, $Z_o$).

With regard to FIG. 1, the following parameters are defined:

t Interaxial Camera Separation: the distance between the front nodal points of the two camera lenses.

f Lens Focal Length: The focal length of the two camera lenses 112a, 112b.

h Image Sensor Offset: The distance an image sensor 114a, 114b has been horizontally shifted outwards from the optical axis of a lens. Equivalent horizontal image shifting can be performed after acquisition (which is commonly referred to as Horizontal Image Translation, a.k.a. HIT).

C Convergence Distance: The distance from the convergence point to the midpoint between the front nodal points of the two camera lenses. Using similar triangles in FIG. 1, it is possible to derive the equation for convergence distance C, as follows, similar triangles require that the geometric relationship C/(t/2)=f/h exists. This relationship can be manipulated to solve for C, e.g., $$C = \frac{tf}{2h},$$

$W_c$ Image Sensor Width: The width of the image sensor.

($X_o$, $Y_o$, $Z_o$) The coordinate of the object in front of the camera in object space coordinates.

$X_{cl}$, $X_{cr}$ The x-coordinate of the imaged object on the left image sensor 114a and the right image sensor 114b.

The center of the camera sensor is the origin of the sensor coordinates ($X_{cl}=0$, $Y_{cl}=0$) and ($X_{cr}=0$, $Y_{cr}=0$) for respective left image sensor 114a and right image sensor 114b. When the object 10 is imaged onto the right image sensor 114a or the left image sensor 114b, the x-coordinates of the object may be transformed to the corresponding coordinate system of the camera imaging sensors for both the right and left image sensors 114a, 114b, respectively, using the following equations programmed into an image processing system, e.g., a microprocessor coupled to a computer memory and input/output ports:

$$X_{cr} = -f\left(\frac{t - 2X_o}{2Z_o}\right) + h \quad (1a)$$

$$X_{cl} = f\left(\frac{t + 2X_o}{2Z_o}\right) - h \quad (1b)$$

The y-coordinate of the object on the image sensor can similarly be computed. In general, the algorithms and/or equations described herein may be implemented by programming an image processing system using suitable software and/or firmware.

Figure 2:
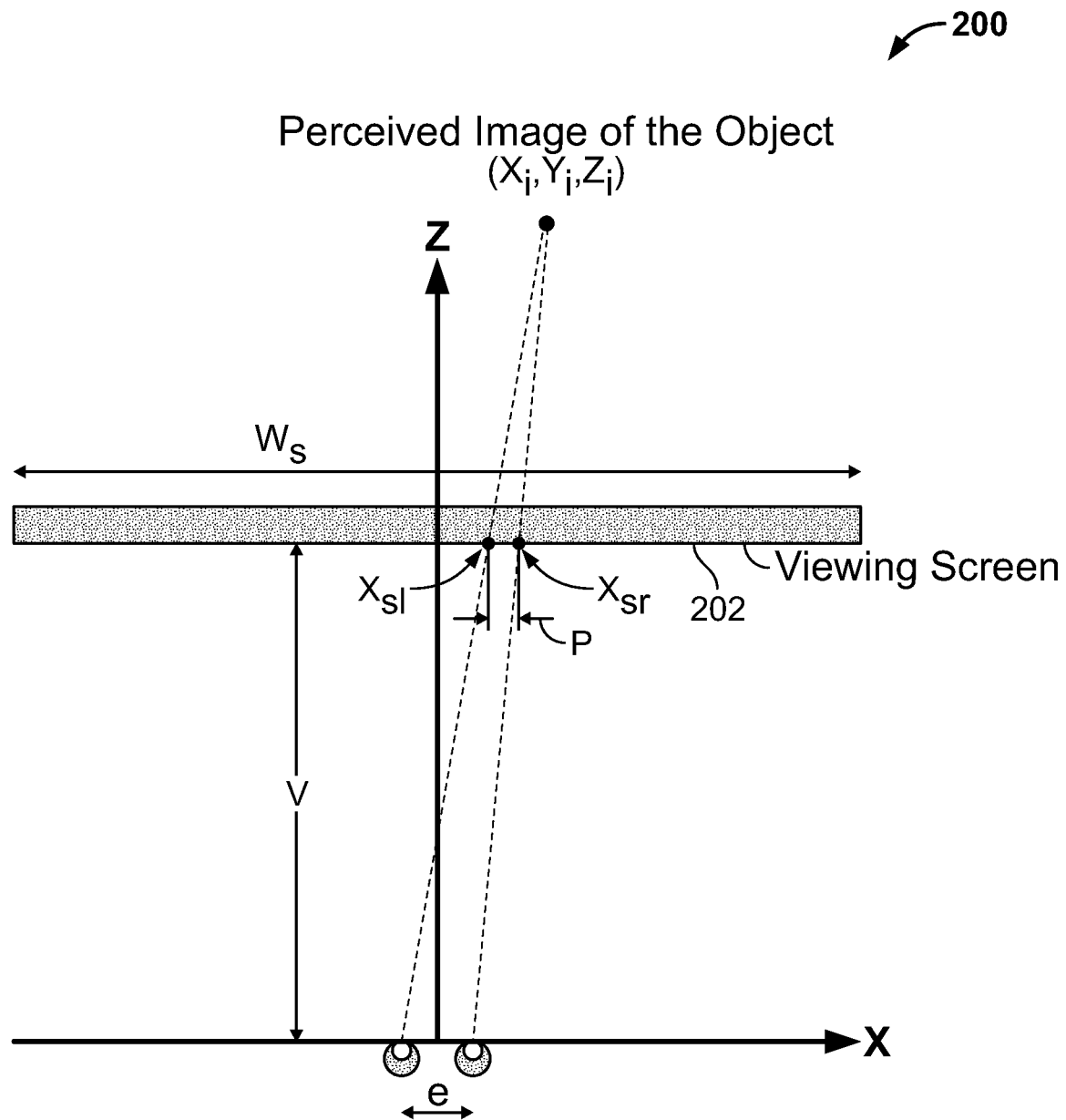
FIG. 2 shows a 3D display system with associated parameters.

FIG. 2 illustrates a viewing environment 200 in which an observer views 3D content on a display of width $W_s$ at a viewing distance V. When the object is displayed on a 3D viewing screen 202 (e.g. a 3D television display), image sensor coordinates are transformed into screen coordinates. This transformation from sensor to screen may simply be a multiplication by a screen magnification factor M, where M is the ratio of the viewing screen width ($W_s$) to the original image sensor width ($W_c$), $$M = \frac{W_s}{W_c}.$$

Thus, the x-coordinates on the 3D viewing screen for the right ($X_{sr}$) and left ($X_{sl}$) eye views may be determined expressed as:

$$X_{sr} = MX_{cr} = M\left(-f\left(\frac{t-2X_o}{2Z_o}\right)+h\right) \quad (2a)$$

$$X_{sl} = MX_{cl} = M\left(f\left(\frac{t+2X_o}{2Z_o}\right)-h\right) \quad (2b)$$

With regard to FIG. 2, the following parameters are defined:

$X_i$ The x-coordinate of the image of the object as perceived by an observer when displayed on the screen.

$Z_i$ The z-coordinate of the image of the object as perceived by an observer when displayed on the screen.

e Eye Separation: The distance between the observer's eyes. For adults this is approximately 65 millimeters (mm).

P Screen Parallax: The horizontal distance between homologous points on the 3D viewing screen, defined as $P=X_{sr}-X_{sl}$.

The z-coordinate $Z_i$ may be defined as the distance along the Z-axis from the viewer to the image of the object as perceived in the 3D viewing environment. The coordinates $X_i$ and $Z_i$ may be expressed as a function of the viewing distance V, the eye separation e, the screen parallax P, and the screen coordinates $X_{sr}$ and $X_{sl}$, using the following equations implemented in a computer as algorithms:

$$X_i = \frac{e(X_{sl}+X_{sr})}{2(e-P)} \quad (3a)$$

$$Z_i = \frac{Ve}{e-P} \quad (3b)$$

When screen parallax P=0 (i.e. there no difference between left and right eye views on the screen), $Z_i$=V. This relationship indicates that the image of the object appears at the plane of the screen. When P is positive, $Z_i$>V, and thus the image of the object appears behind the screen plane. When P is negative, $Z_i$<V, and thus the image of the object appears in front of the screen plane (closer to the viewer). Note that when P=e, $Z_i$=infinity. Also, when P>e, divergence occurs and it is likely that for small amounts of divergence that the viewer will still perceive that $Z_i$=infinity, but for large amounts of divergence a stereo image will not be fusible.

Substituting the value for $P=X_{sr}-X_{sl}$ into equations 3a and 3b, respectively, leads to the derivation of the complete x-coordinate/z-coordinate transformation algorithm from the object space (original object in front of the camera) to the image space (the image of the object as perceived by an observer when displayed on the 3D screen), as follows:

For $X_i$ $$X_i = \frac{e(X_{sl}+X_{sr})}{2(e-(X_{sr}-X_{sl}))} \quad (4)$$

$$Xi = \frac{e\left[M\left(f\left(\frac{t+2X_o}{2Z_o}\right)-h\right)+M\left(-f\left(\frac{t-2X_o}{2Z_o}\right)+h\right)\right]}{2\left(e-\left[M\left(-f\left(\frac{t-2X_o}{2Z_o}\right)+h\right)-M\left(f\left(\frac{t+2X_o}{2Z_o}\right)-h\right)\right]\right)}$$

$$Xi = \frac{MefX_o}{Mft-Z_o(2Mh-e)}$$

For $Z_i$ $$Z_i = \frac{Ve}{e-(X_{sr}-X_{sl})} \quad (5)$$

$$Z_i = \frac{Ve}{e-\left[M\left(-f\left(\frac{t-2X_o}{2Z_o}\right)+h\right)-M\left(f\left(\frac{t+2X_o}{2Z_o}\right)-h\right)\right]}$$

$$Z_i = \frac{VeZ_o}{Mft-Z_o(2Mh-e)}$$

Shape Ratio

The change in the shape of an object can be expressed as the ratio of the object's 3D depth magnification (change along the z-axis) and the object's 3D width magnification (change along the x-axis). The change of the object's shape is referred to as the 3D Shape Ratio S. When S equals 1.0, the object will appear to have minimal shape distortion. In other words, the ratio of the perceived depth of an object and the perceived width of an object does not change from the object's original proportions.

FIG. 3A illustrates examples of Shape Ratio, with a sphere 300, for example a basketball. Here, the sphere 300 is captured, using a 3D camera. In the object space, the basketball is spherical. After capturing by the 3D camera, and then displaying and viewing the basketball in a 3D viewing environment, there are three possible outcomes on how the sphere's shape will be perceived by the viewer:

1. The sphere appears to be perfectly spherical (S=1) (Left panel)
2. The sphere appears compacted along the z-axis (S<1) (Center panel)
3. The sphere appears elongated along the z-axis (S>1) (Right panel)

During 3D acquisition, utilizing the Shape Ratio can be beneficial in meeting the creative vision of a film. From a practical point of view, however, application of the Shape Ratio can pose a challenge. Application requires an understanding of the components of the shape ratio, namely 3D width magnification and depth magnification, and how each can be affected by decisions made on set.

2D Width Magnification, 3D Width Magnification, Depth Magnification and Shape Ratio 2D Width Magnification When an object is captured with a two-dimensional (2D) camera and subsequently viewed in 2D by an observer, the image of the object's width is dependent on the original width of the object, the camera lens focal length, the screen magnification, and the distance of the object to the camera. The image of the object's 2D width on the screen can be derived by computing screen coordinates of two different points on the left and right edges of the object. Respectively, these points have different positions in object space along the X-axis, but the same position along the Y-axis and Z-axis. For example, point A may lay on the left edge of the object with coordinates ($X=X_{oa}$, $Y=Y_o$, $Z=Z_o$) and point B may lay on the right edge of the object with object coordinates ($X=X_{ob}$, $Y=Y_o$, $Z=Z_o$). The width of the object equals the difference in the x-coordinates of points A and B. Therefore, the width of the object can be represented with the equation $W_o=X_{ob}-X_{oa}$. The width of the image of the object ($W_{i2D}$) on the screen will accordingly have the value determined by the difference in screen coordinates ($X_{sb}-X_{sa}$), which can be computed as follows: $W_{i2D}=X_{sb}-X_{sa}$ $W_{i2D}$ can be computed in terms of the $X_{oa}$ and $X_{ob}$, using equation 2b to substitute for $X_{sb}$ and $X_{sa}$.

$$W_{i2D} = M\left(f\left(\frac{t+2X_{ob}}{2Z_o}\right)-h\right) - M\left(f\left(\frac{t+2X_{oa}}{2Z_o}\right)-h\right)$$

$$W_{i2D} = M\left(f\left(\frac{2Xob-2Xoa}{2Z_o}\right)\right)$$

Substituting the object width, $W_o=X_{ob}-X_{oa}$, into the above equation results in an equation for the 2D image width $W_{i2D}$ in terms of the actual object width $W_o$:

$$W_{i2D} = \frac{MW_o f}{Z_o} \quad (6)$$

As one may expect, as an object's distance from the camera ($Z_o$) increases the image of the object's width decreases. Likewise, as the screen magnification (M) increases (i.e. the viewing screen gets larger), the image of the object's width increases. Similarly, as the focal length of the camera lens (f) increases (use of a longer lens), the image of the object's width increases. The 2D width magnification ($M_{W2D}$) can then be defined as the ratio of the image of the object's width $W_{i2D}$ to the original object width $W_o$:

$$M_{W2D} = \frac{W_{i2D}}{W_o} = \frac{Mf}{Z_o} \quad (7)$$

3D Width Magnification

When viewing the image of the object in 2D, the observer's eyes are converged on the plane of the screen with each eye seeing the same image of the object. John T. Rule's paper, "The Geometry of Stereoscopic Projection," for example, discusses that the observer, not having knowledge about the original scene (camera lens focal length, original size of the object, distance of the object to the camera), may make multiple judgments about the size of the object being viewed. For example, if the object is an automobile, the automobile could be either a miniature automobile shot from a camera at a short distance from the miniature or a life-size automobile shot at a greater distance from the camera.

If the same object was captured with a 3D camera and then viewed in 3D the two images of the object (left and right) would not be identical. The disparity between the image of the object in the left eye and the same object in the right eye would produce parallax. As a result of this parallax, the object and all of the objects that surround it would be placed at different positions along the z-axis in 3D space (some behind the screen, some in front of the screen, and some objects that straddle the screen plane). The object being focused on by the observer will be perceived to be positioned in 3D space at the coordinates ($X_i, Y_i, Z_i$) per the earlier discussion and therefore the object's perceived width is not simply the width of the image of the object on the screen as it is when viewing in 2D. Instead, the width of the image of the object is related to the location of that object's image along the z-axis in relation to the viewer.

During 3D acquisition and viewing, if the width of the image of an object is not dependent on the location of that object's image along the z-axis, interesting phenomena may result. FIG. 3B illustrates width magnification effect that may be observed. For example, if an object 350 is placed in front of the screen in 3D space, an observer would expect the image of the object to occupy a larger portion of the field of view as it gets closer to the observer, i.e. width of the image of the object is dependent on its location along the z-axis. However, if the object occupies the same portion of the field of view as it gets closer to the viewer, it will appear abnormally small in relation to its virtual distance from the observer. This is commonly known as "miniaturization," wherein the width magnification is less than one, as shown in the center panel of FIG. 3B. Conversely, if an object is positioned behind the screen in 3D space, one would expect the occupied portion of the field of view of the image of the object to get smaller as it gets farther away from the observer. If the width of the image of the object stays the same size as it recedes into the screen, it will appear abnormally large in relation to the its virtual distance from the observer. This is commonly known as "gigantism," wherein the width magnification is greater than 1, shown in the right panel of FIG. 3B.

Similar to the above derivation of the 2D image width $W_{i2D}$, the 3D width of the image of the object $W_{i3D}$ is the difference between the left and right edges of the image of the object's $X_i$ coordinates, which can be computed by solving for the difference in the value of $X_i$ using equation 4 at the points $X_o=X_{ob}$ and $X_o=X_{oa}$ respectively.

$$W_{i3D} = X_{ib} - X_{ia} \quad (8)$$

$$W_{i3D} = \frac{MefX_{ob}}{Mft - Z_o(2Mh-e)} - \frac{MefX_{oa}}{Mft - Z_o(2Mh-e)}$$

$$W_{i3D} = \frac{Mef(X_{ob}-X_{oa})}{Mft - Z_o(2Mh-e)}$$

$$W_{i3D} = \frac{MefW_o}{Mft - Z_o(2Mh-e)}$$

Following the same derivation as for the 2D width magnification, the 3D width magnification of the image of the object is defined as $M_{W3D}$ and is the ratio of 3D image width $W_{i3D}$ to the original object's width $W_o$:

$$M_{W3D} = \frac{W_{i3D}}{W_o} = \frac{Mef}{Mft - Z_o(2Mh-e)} \quad (9)$$

If the value of the 3D width magnification $M_{W3D}$ for an object at a particular distance $Z_o$, is less than 1, then it is likely that the viewer will perceive that the image of the object is actually smaller than it is on set in front of the camera, i.e. the 3D system is exhibiting miniaturization for this object. If the value of the 3D width magnification $M_{W3D}$ for an object at a particular distance $Z_o$, is greater than 1, then it likely that the viewer will perceive that the image of the object is actually larger than it is on set in front of the camera, i.e. the 3D system is exhibiting gigantism for this object.

3D Depth Magnification

The 3D depth magnification factor is the ratio of change in the depth of the image of the object to the change in the original object's depth. This 3D depth magnification factor can be computed as the derivative of equation 5 ($Z_i$—the image distance) with respect to the original object's distance $Z_o$. This derivative computation is a bit tedious due to the non-linear relationship between $Z_i$ and $Z_o$, but it is possible via the quotient rule. Equation 5 can be put in the following form:

$$Z_i = \frac{aZ_o}{b - cZ_o}$$

where a, b and c are constants relative to $Z_o$, with a=Ve, b=Mft and c=2Mh−e. The derivative of $Z_i$ with respect to $Z_o$ is then equal to $$M_d = \frac{dZ_i}{dZ_o} = \frac{d}{dZ_o}\left(\frac{aZ_o}{b - cZ_o}\right) = \frac{(b - cZ_o)(a) - (-c)(aZ_o)}{(b - cZ_o)^2} = \frac{ab}{(b - cZ_o)^2}$$

The constants a, b and c can then be substituted back into the above equation for $M_d$ to obtain the full form of the 3D depth magnification equation in terms of the camera and viewing parameters:

$$M_D = \frac{dZ_i}{dZ_o} = \frac{MVeft}{(Mft - Z_o(2Mh - e))^2} \quad (10)$$

Shape Ratio

As discussed previously, the 3D shape ratio is the ratio of the 3D depth magnification to the 3D width magnification, and it follows that the 3D shape ratio can be computed as:

$$S = \frac{M_D}{M_{W3D}} = \frac{\frac{MVeft}{(Mft - Z_o(2Mh - e))^2}}{\frac{Mef}{Mft - Z_o(2Mh - e)}} \quad (11)$$

$$S = \frac{Vt}{Mft - Z_o(2Mh - e)}$$

Effect of Viewing Screen Size

Given the mathematical model established above, it is possible to simulate various scenarios which vary one or more of the variables to determine the effect on the 3D images as perceived by the viewer in 3D.

Up until recently 3D content viewing has been limited to the cinema, i.e. on larger screens, and therefore the issue of varying the viewing screen size has not been considered important to 3D content production workflows. That is, 3D content was composed for and viewed on only larger screens. Recently, however, the availability of 3D televisions and other small screen 3D devices such as 3D mobile phones and portable 3D gaming devices has extended the range of screen sizes on which 3D content is viewed. As a result, the effect of viewing content composed for a large screen on smaller screens should be understood in order to adequately service these types of 3D distribution channels. When 3D content composed for a large screen (e.g. 20 foot wide screen) is viewed on a 3D television (e.g. 46° diagonal) one can see that the shape of 3D content is compacted along the z-axis as the shape ratio for each object in the scene decreases.

Figure 4B:
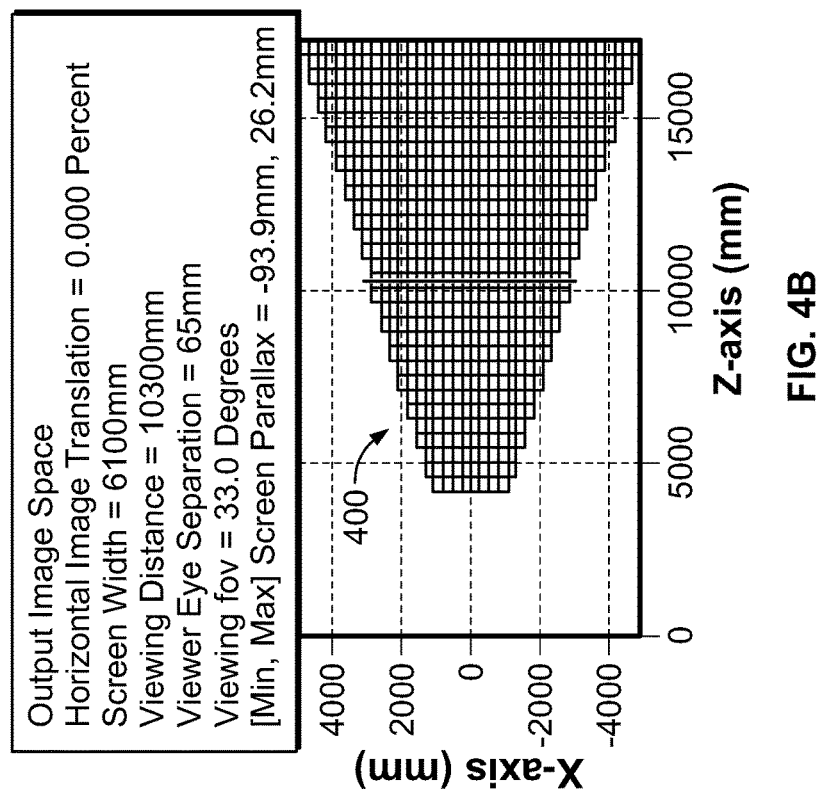
FIG. 4B shows an output image space when 3D images are viewed on a 20-inch wide screen.
Figure 4A:
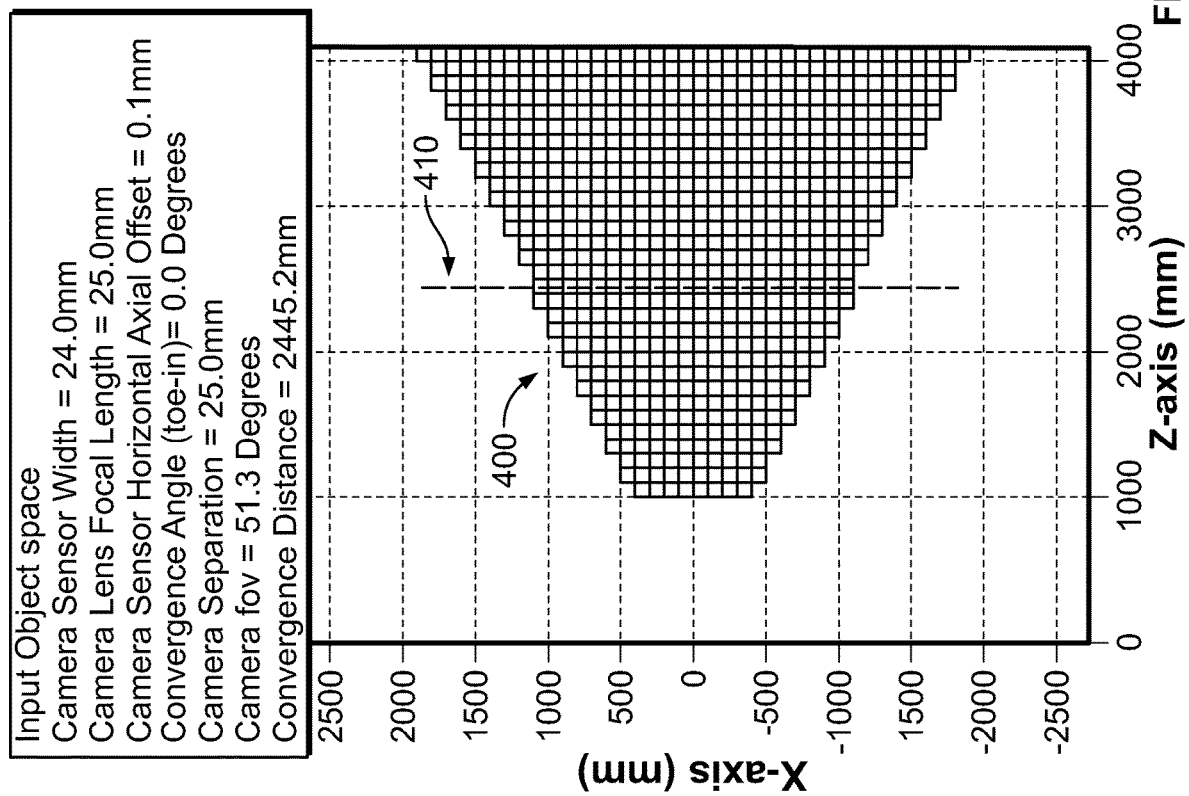
FIG. 4A shows an input object space on set in front of 3D camera.

FIG. 4a illustrates a scene including a grid of cubes 400, using various camera parameters. The dashed line 410 shows the apparent position of the view screen relative to the grid 400, with respective portions of the grid 400 in front of and behind the view screen. FIG. 4b illustrates the output image space ($X_i$, $Z_i$) 402 for an image of the grid of cubes 400 as perceived by an observer sitting approximately 10.3 meters away from the screen (approximately three screen heights from the screen, assuming the viewing screen has a 16:9 aspect ratio for the purposes of calculating the screen height.

FIG. 4b further illustrates some minor shape distortion (specifically elongation as the squares appear as rectangles) because the viewing field of view is narrower than the camera field of view. Nonetheless, the shapes of the objects as perceived by the observer are relatively similar to the original objects that were captured by the camera and their shapes are relatively constant for all objects in the scene.

Figure 5:
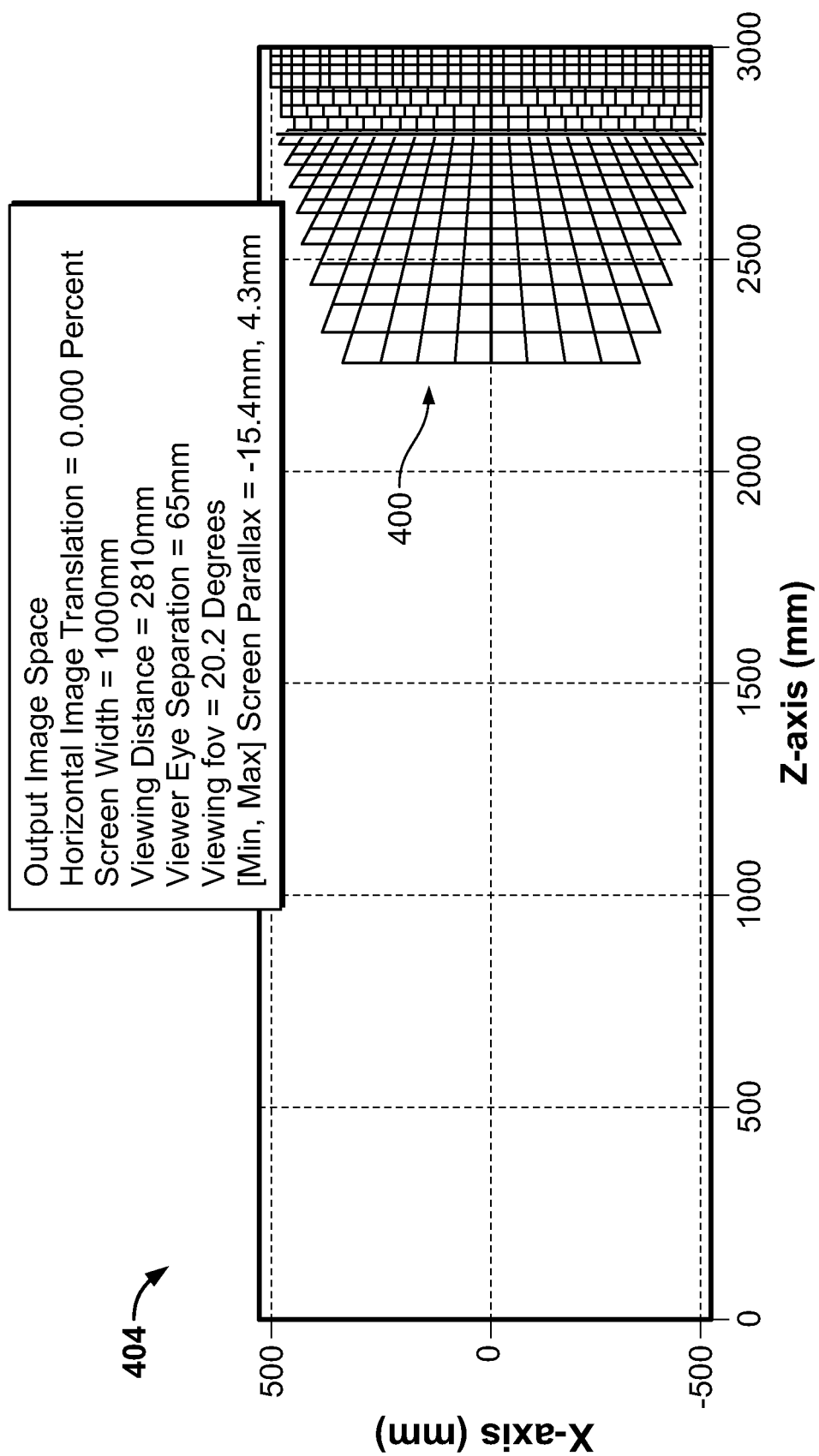
FIG. 5 shows an output image space when 3D images are viewed on a 46-inch 3D television.

As shown in FIG. 5, when the same 3D content including the grid 400 is viewed on a 46-inch 3D television (measured diagonally) having a second image space 404, the shapes of the objects as perceived by the observer sitting at a distance of approximately 2810 mm (3 screen heights) become compacted as the object's distance increases (S decreases as $Z_o$ increases). Note that the shape ratio becomes further reduced for objects further away from the camera, i.e. it is a non-linear relationship.

Figure 6:
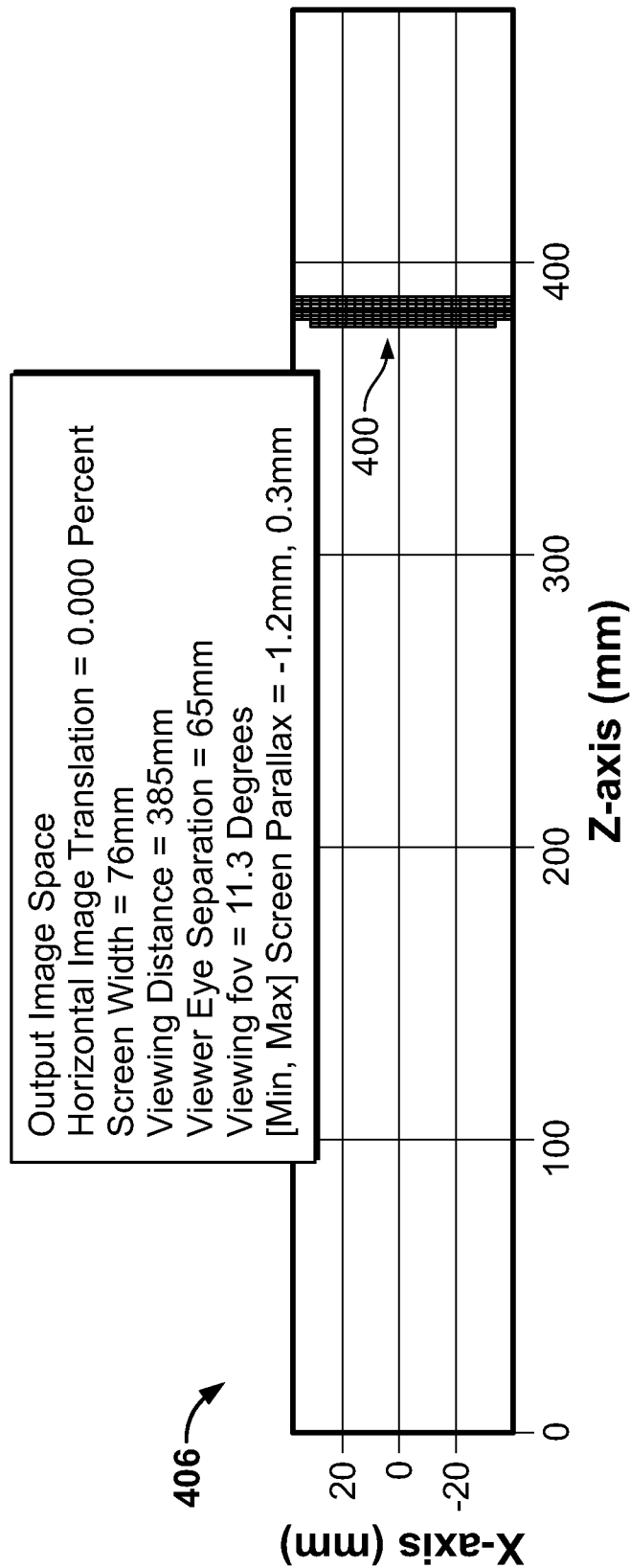
FIG. 6 shows an output image space when 3D images are viewed on a 3.5-inch 3D screen.

FIG. 6 illustrates the same 3D content unlacing the grid 400 when viewed on a 3.5-inch 3D display (measured diagonally) at a distance of approximately 385 mm (9 screen heights) characterizing a third image space 406. In this case, the compaction is quite severe with very little depth as perceived by the observer (1.5 mm in total image parallax). Note, however, if the viewer were closer to the screen (3 screen heights), the compaction would be even greater. According to equation 11, the shape ratio is proportional to the viewing distance (i.e. a decrease in V results in an equal decrease in S).

Effect of Horizontal Image Translation

From a creative point of view, "setting convergence" is primarily used to position the desired object such that it appears at the screen plane when the images are viewed in 3D. The conventional method to set convergence after acquisition is to apply an equal horizontal shift h to each of the 3D images (left/right). This is known in practice as "horizontal image translation" (HIT). HIT happens after 3D acquisition (whether native 3D captured or rendered). The units of HIT are often expressed either as a percentage of the image width or in units of pixels.

The equation below describes how to convert an image sensor horizontal shift (h) value into a HIT percentage of image width value:

$$\text{HIT\_percentage} = (h/W_c) * 100\%$$

The equation below describes how to convert an image sensor horizontal shift (h) value into a HIT pixel shift:

$$\text{HIT\_pixels} = (h/W_c) * Xres$$

Xres in the above equation represents the horizontal resolution of the image. Common values for Xres are 720, 1280, 1920, 2048 or 4096 for example.

When the sign of h is positive (positive HIT) the right image is shifted right and the left image is shifted left. When the sign of h is negative (negative HIT) the right image is shifted left and the left image is shifted right.

Figure 7:
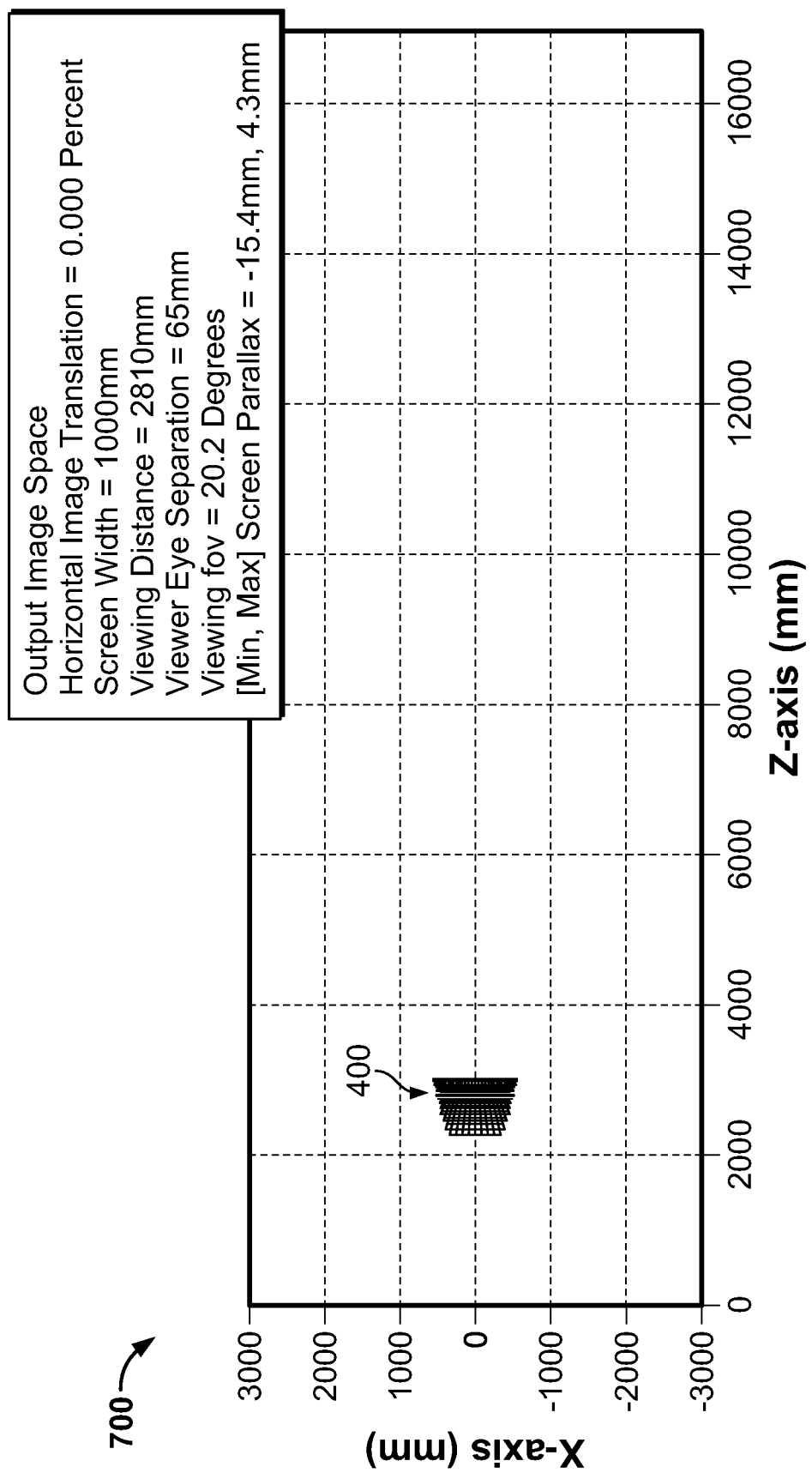
FIG. 7 shows another output image space when 3D images are viewed on a 46-inch 3D television.

Another potential use of HIT is to mitigate some of issues described above, regarding the effect of screen size on the shape ratio of objects in a shot. Recall that FIG. 5 illustrates the perception of content that was originally composed for a 20-inch wide screen and then viewed on a 46-inch 3D television. FIG. 7 illustrates the same 3D perception of the grid 400 as FIG. 5, plotting the same $X_i/Z_i$ data on a modified x-axis/z-axis scale 700.

Figure 8:
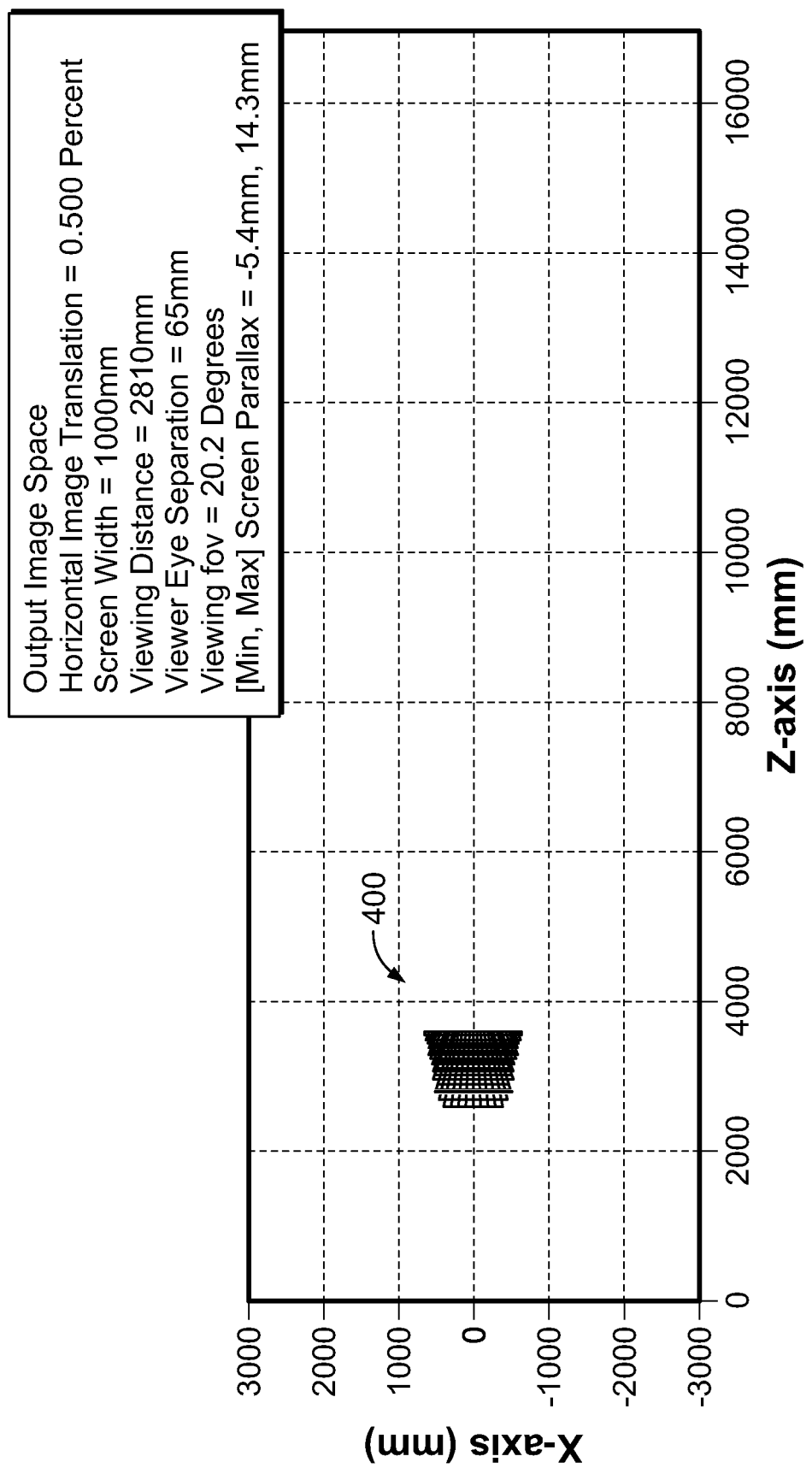
FIG. 8 shows an output image space when 0.5% HIT is applied to 3D images viewed on a 46-inch 3D television.
Figure 9:
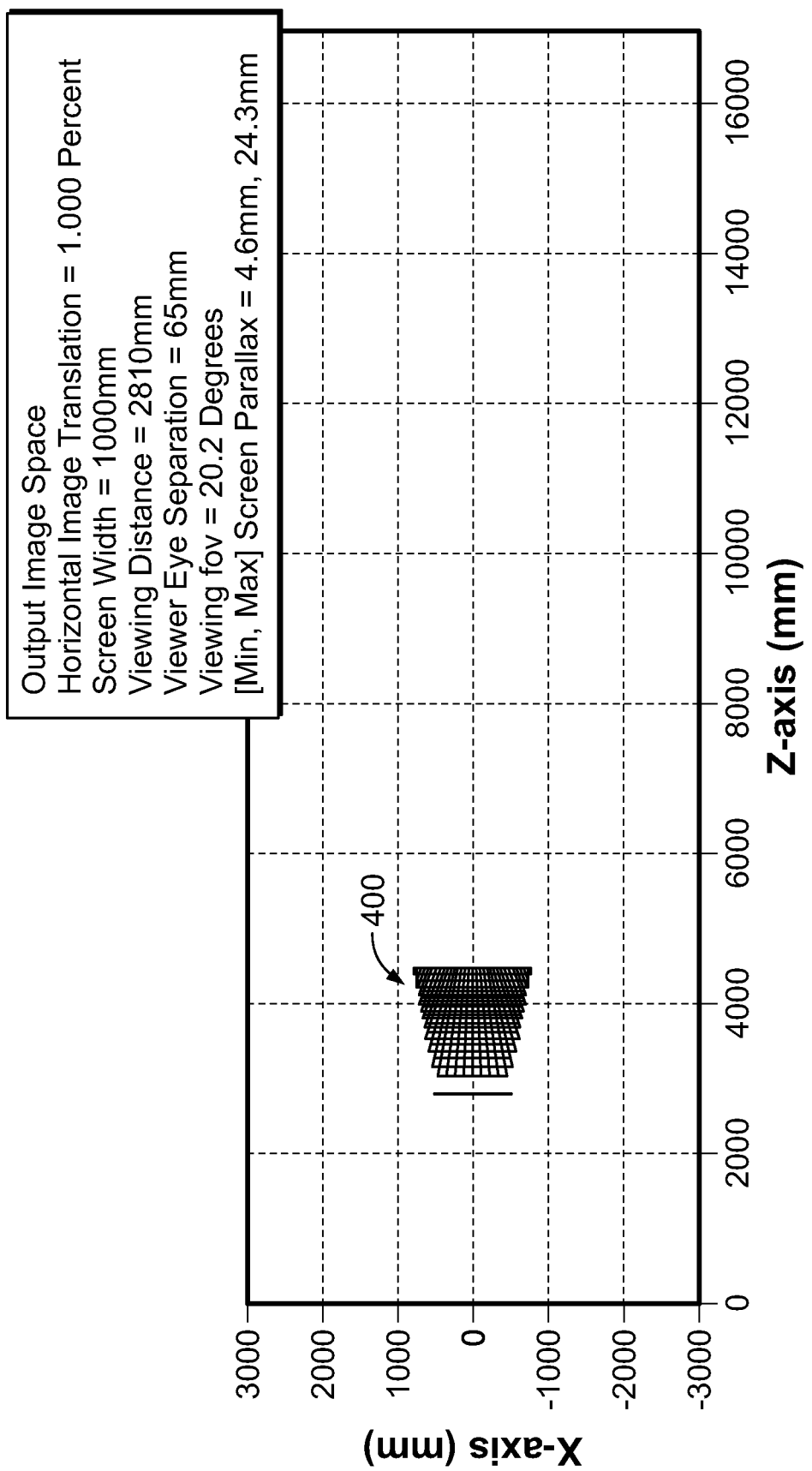
FIG. 9 shows an output image space when 1.0% HIT is applied to 3D images viewed on a 46-inch 3D television.

As shown in FIG. 8, when 0.5% HIT is applied to the stereoscopic image pair the result is both a change in the convergence distance and a change in the shapes of the objects (e.g., grid 400) as perceived by the view. Larger HIT values of 1.0% and 2.5% are shown in FIGS. 9 and 10, respectively, with corresponding effects on the grid 400.

Figure 10:
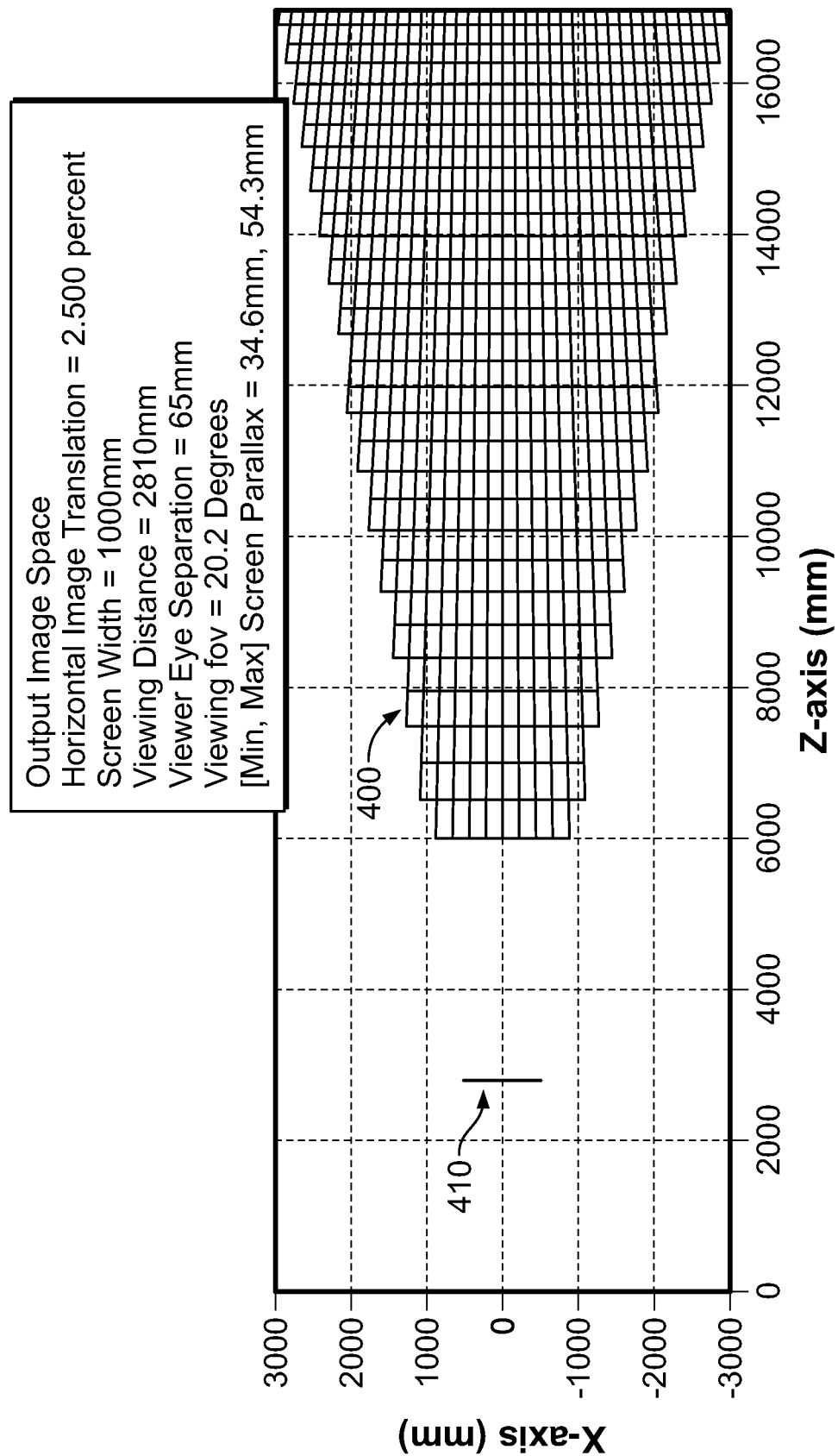
FIG. 10 shows an output image space when 2.5% HIT is applied to 3D images viewed on a 46-inch 3D television.

As shown in FIG. 10, when 2.5% HIT is applied to the 3D images, the shape ratio of objects (e.g., grid 400) is very close to the shape ratio achieved when viewing the original content (0.0% HIT) on the 20' wide screen (see FIG. 4b). However, the convergence distance has been dramatically altered and may result in a considerably different viewing experience such that objects that were in front of the screen 410 are pushed behind the screen.

Robert Kutka, "Reconstruction of Correct 3-D Perception on Screens Viewed at Different Distances", IEEE Transactions on Communications, Vol. 42, No. 1 (January, 1994): 29-33 describes adding a horizontal shift (HIT) to images that are viewed on different screen sizes in order to preserve the original 3D geometry. Kutka suggests that the amount of horizontal shift that should be applied to the images is dependent on the size difference between the source screen and the target screen and states that the appropriate horizontal shift is dependent on the "stretching factor." As used herein, the "stretching factor" is referred to as the variable $M_{change}$. Based on Kutka's derivation, the appropriate horizontal shift $$HIT_{change} = \frac{e}{2}(1 - M_{change}), \text{ where}$$

$$M_{change} = \frac{W_{S_{new}}}{W_{S_{original}}}$$

$M_{change}$ is the change in magnification due to viewing on a different screen, and is equal to the new screen width divided by the original screen width. For the example described previously, with an original screen width equal to 6100 mm (20 feet) and the new screen width of 1000 mm (46 inch diagonal), the value of $M_{change}$=1000 mm/6100 mm=0.164. For this example, the value of $HIT_{change}$ is equal to $HIT_{change}$=(65 mm/2)*(1−0.164)=27.2 mm. As a percentage of screen width this equals 27.2 mm/1000 mm=2.72%, which is close to the shift of 2.5% illustrated in FIG. 10.

Another way to describe the HIT suggested by Kutka is that it ensures that the image of the object points that are perceived at infinity on the original screen size are perceived at infinity on the new screen size. Additionally, if the viewing field-of-view is maintained from the original viewing environment to the new viewing environment, then the shape of the images of the objects will be preserved. The data table 1100 shown in FIG. 11 shows values of Kutka's suggested HITchange value expressed as a percentage of screen width for various display sizes.

The darkened section of Table-1 shows $HIT_{change}$ values that are appropriate when moving from a theatrical size screen to a smaller screen, e.g. a home entertainment sized screen.

In the film-studio production model, it is common for a feature to be mastered for the large theatrical viewing environment and then repurposed for the home entertainment viewing environment. When preparing the home entertainment master from the theatrical master, it is common to make small adjustments to color and tone characteristics to ensure that the director's creative intent is preserved in the home entertainment viewing environment. For 3D features, it is possible to add an additional step to the home entertainment mastering process to apply HIT to the images so they will retain the intended shape when viewed in the home entertainment viewing environment. It would also be possible to embed a horizontal shift operation in the 3D display or playback device. Metadata about the mastering screen size would be needed if a shape-preserving HIT is applied by the display or playback device.

Additionally, the desire to preserve the shape of objects by performing HIT should be balanced with the desire to avoid introducing significant convergence or accommodation mismatch issues which can be exaggerated by performing HIT. For example, the convergence or accommodation mismatch zone-of-comfort could be computed for each screen-size and/or viewing-distance and the shape-preserving HIT applied could be constrained to prevent uncomfortable convergence or accommodation mismatch from occurring in the resulting images.

Setting Camera Parameters

The topic of properly setting up a stereoscopic camera system continues to be a widely debated topic in the industry. Some contentious topics are toe-in vs. parallel, fixed vs. variable interaxial, interaxial set equal to human interocular distance, adjusting convergence during a shot ("pulling convergence"), etc. Traditionally these choices about stereo camera setup have been tasked to the stereographer working on the production, with some input from the director and cinematographer. As discussed above, the scene, camera and viewing parameters affect the viewer's perception of 3D imagery. Understanding the various changes in size and shape that result from adjusting these parameters may be important in achieving the director's creative vision.

Many different methods of setting the camera lens interaxial t, horizontal image sensor shift h, and camera toe-in angle have been described. One reference, in particular, details nine different methods of setting camera parameters called: Zero Convergence, Maximum Far Plane Convergence, Corrected Maximum Far Plane Convergence, Variable-Interaxial Convergence, Maximum Near Object Convergence, Fixed Convergence, Interlocked Focus and Convergence, Main Subject Convergence, and LMC Convergence.

Early guidelines suggest setting interaxial T, according to the following the equation:

$$T = \frac{Wed}{sf}$$

The above equation uses a different notation for camera and viewing parameters, with T as interaxial (instead of t), W as sensor width (instead of $W_c$), s as screen width (instead of $W_s$), and d as convergence distance (instead of C). The equation can be converted to the notation previously discussed herein as the follows:

$$t = \frac{W_c \, e \, C}{W_s f}$$

Substituting $M=W_s/W_c$ and $C=(t*f)/(2*h)$ leads to the following equation:

$$t = \frac{etf}{2hMf} = \frac{et}{2Mh}$$

Canceling the value of t from both sides leads to the following equation:

$$1 = \frac{e}{2Mh}$$

The above equation can be further manipulated to solve for the horizontal shift h as:

$$h = \frac{e}{2M}$$

The effect of this early guideline for setting interaxial based on convergence distance is analyzed "Method 1," described below, with additional methods for setting camera parameters. Note that the methods disclosed herein are not the only methods available to filmmakers. However, it should be noted that similar analyses can be performed for other stereo camera setup methods.

Method-1—Constant Shape Ratio, Interaxial Sets Convergence Distance

As shown in equation 11, the general form of the shape ratio equation is dependent on the object's distance $Z_o$ in addition to the camera parameters t, f and h. The viewing parameter V and combined camera/viewing parameter M also affect the value of the shape ratio. The shape ratio equation is $$S = \frac{Vt}{Mft - Z_o(2Mh - e)}$$

Substituting $h=e/2M$ eliminates the $Z_o$ term, because the value of $(2Mh-e)$ is zero, and therefore allows the t terms to cancel, leaving the simplified form of the shape ratio for Method-1:

$$S = \frac{V}{Mf}, \text{ when } h = \frac{e}{2M}$$

By choosing a horizontal shift h that equals $h=e/2M$, this has the effect of eliminating the shape ratio's dependence on the object's distance $Z_o$. Additionally, the 3D Width Magnification also becomes independent of the object's distance $Z_o$. The shape ratio is just a function of viewing distance V, magnification factor M and camera focal length f, again there is no dependence on the object's distance $Z_o$. This indicates that the perception of the image of the objects will be a perception that the objects are rigid objects that do not change shape, depending on their distance from the camera.

If the magnification factor M in the above equation is expanded as $M=W_s/W_c$, then the shape ratio resulting from using Method-1 results in a relationship between the ratio of the viewing distance to the screen width (screen's field of view according to the viewer) and the ratio of focal length to sensor width (camera's field of view) as follows:

$$S = \frac{V}{Mf} = \frac{W_c V}{W_s f} = \frac{V/W_s}{f/W_c}, \text{ when } h = \frac{e}{2M}$$

Thus, if the camera's field of view is larger than the viewer's field of view ($f/M_c<V/W_s$), then the shape ratio will be greater than 1 (leading to elongation). If the camera's field of view is smaller than then viewer's field of view ($f/W_c>V/W_s$), then the shape ratio will be smaller than 1 (leading to compaction).

The convergence distance using the value of $h=e/(2*M)$ used in Method-1 will be $$C = \frac{tf}{2h} = \frac{tf}{2\frac{e}{2M}}$$

$$C = \frac{tfM}{e}, \text{ when } h = \frac{e}{2M}$$

It may be desirable to set the convergence distance to a specific value based on the distance to the object of attention in the shot, much like setting the focus distance when the depth of field is shallow. Setting the convergence distance to the distance of the object of attention can help minimize focus/convergence mismatch issues, and can also make editing easier when cutting between two different shots (i.e. the viewer will always be converging on the object of attention which would be at the screen plane). Regardless of the creative choice of where the convergence plane should be, if Method-1 is used then the interaxial t can be used to set this convergence distance because horizontal shift h is already fixed to $h=e/(2*M)$. The interaxial value used to achieve the desired convergence distance C can then be determined by solving for t in the above equation as follows:

$$t = \frac{Ce}{fM}, \text{ when } h = \frac{e}{2M}$$

The equation for the perceived distance to the image of the object $Z_i$ can be simplified when using Method-1 by substituting $h=e/(2M)$ as follows:

$$Z_i = \frac{VeZ_o}{Mft - Z_o(2Mh - e)}$$

$$Z_i = \frac{VeZ_o}{Mft}, \text{ when } h = \frac{e}{2M}$$

The value of $Z_i$ can be expressed as a function of the convergence distance C if the value of the interaxial t used for Method-1, $t=(C*e)/(f*M)$, is substituted into the above equation for $Z_i$ as follows:

$$Z_i = \frac{VZ_o}{C}, \text{ when } h = \frac{e}{2M} \text{ and } t = \frac{Ce}{fM}$$

The 3D Width Magnification can also be evaluated using the horizontal shift h value specified by Method-1 h=e/(2*M) as follows:

$$M_{W3D} = \frac{Mef}{Mft - Z_o(2Mh-e)}$$

$$M_{W3D} = \frac{e}{t}, \text{ when } h = \frac{e}{2M}$$

If the value of interaxial t is used from the equation above, t=(C*e)/(f*M), then 3D Width Magnification can be expressed as a function of the convergence distance as follows:

$$M_{W3D} = \frac{Mf}{C}, \text{ when } h = \frac{e}{2M} \text{ and } t = \frac{Ce}{fM}$$

The equation for the 3D Image Width achieved using Method-1 can also be simplified by substituting h=e/(2M) as follows:

$$W_{i3D} = \frac{MefW_o}{Mft - Z_o(2Mh-e)}$$

$$W_{i3D} = \frac{eW_o}{t}, \text{ when } h = \frac{e}{2M}$$

Which can similarly be expressed in terms of convergence distance C using Method-1 by substituting t=(C*e)/(f*M), as follows:

$$W_{i3D} = \frac{MfW_o}{C}, \text{ when } h = \frac{e}{2M} \text{ and } t = \frac{Ce}{fM}$$

Method-1 can be summarized as follows:
1) Set horizontal shift h=e/(2M)
2) Choose a convergence distance C using some creative film making decisions—a likely choice will be the distance to the object of attention in the scene.
3) Set camera interaxial t equal to t=(C*e)/(f*M)

One creative aspect of Method-1 is the likely perception of a "rigid world" that does not change shape (elongation/compaction) or size (miniaturization/gigantism) when objects move closer or farther from the camera along the Z-axis on set. This "rigid world" look would likely be excellent for use in remote operation of equipment/vehicles utilizing real-time video because the apparent spacing between objects and the perceived size of objects would not change relative to the object's distance from the camera. This "rigid world" look may have shape and size distortions, but those distortions will be fixed and will not change based on the object distance.

This "rigid world" look would likely be appropriate for a shot with significant amounts of object motion and/or camera motion along the z-axis. An example of this type of scene would be an "in-car" camera inside a race-car pointing out the front or back window, a "point-of-view" shot intended to show someone's view while walking around, or perhaps a shot in which the camera "follows" behind an actor moving through a crowd or environment.

Additionally, at least one reference indicates that the viewer would be positioned relative to the screen such that a projected view would have the same angular dimension for the viewer as the scene taken by the camera. The equation V=sf/w may be used to satisfy these suggested field-of-view guidelines. Converting this suggested viewing distance equation to the notation used herein leads to the following equation:

$$V = \frac{W_s f}{W_c} = Mf$$

Note that if this viewing distance guideline is followed in addition to the horizontal shift h guideline (h=e/2M), a shape ratio of 1.0 will be achieved for the entire scene.

Method 2—Shape Ratio 1.0 at Convergence Plane, Interaxial Sets Convergence Distance The goal of Method-2 is for the image of the object at the convergence plane to have a shape ratio value of 1.0. In order to derive the camera settings for this method, the value of the shape ratio of the image of the object at the convergence distance C must be derived by substituting the convergence distance C for the object distance $Z_o$, $Z_o$=C=(t*f)/(2*h) into the shape ratio equation as follows:

$$S = \frac{Vt}{Mft - Z_o(2Mh-e)}$$

$$S(Z_o = C) = \frac{Vt}{Mft - \frac{tf}{2h}(2Mh-e)} = \frac{2Vh}{ef}$$

Note that the equation $S(Z_o=C)=(2Vh)/(ef)$ is the value of the shape ratio of the image of the object at the convergence plane for any parallel camera setup method—it is not limited to this particular Method-2. The next step is to solve for the value of h that achieves a shape ratio of 1.0 as follows:

$$S(Z_o = C) = \frac{2Vh}{ef}$$

$$1 = \frac{2Vh}{ef}$$

$$h = \frac{ef}{2V}$$

The next step is to substitute this value of h into the convergence distance equation as follows:

$$C = \frac{tf}{2h} = \frac{tf 2V}{2ef} = \frac{tV}{e}$$

Once the convergence distance C is chosen then the above convergence distance equation can be rearranged to solve for the corresponding camera interaxial t as follows:

$$C = \frac{tV}{e}$$

$$t = \frac{Ce}{V}$$

Now that the camera parameters t and h have been determined analytically for this method, the shape ratio and 3D width magnification achieved by this Method-2 can be analyzed. Substituting the value of the h=(ef)/(2V) into the shape ratio equation leads to the following:

$$S = \frac{Vt}{Mft - Z_o(2Mh - e)}$$

$$S = \frac{V^2 t}{MftV - Z_o e(Mf - V)}, \text{ when } h = \frac{ef}{2V}$$

Substituting the value of t=(Ce)/V into the above equation leads to the following equation for the shape ratio for Method-2:

$$S = \frac{VC}{Mf(C - Z_o) + Z_O V}, \text{ when } h = \frac{ef}{2V} \text{ and } t = \frac{Ce}{V}$$

The 3D Width Magnification can also be computed for Method-2 by substituting h=(ef)/(2V), and t=(Ce)/V into the 3D Width Magnification equation as follows:

$$M_{W3D} = \frac{Mef}{Mft - Z_o(2Mh - e)}$$

$$M_{W3D} = \frac{Mef}{Mf\left(\frac{Ce}{V}\right) - Z_o\left(2M\left(\frac{ef}{2V}\right) - e\right)}$$

$$M_{W3D} = \frac{MfV}{MfC - Z_o(Mf - V)}, \text{ when } h = \frac{ef}{2V} \text{ and } t = \frac{Ce}{V}$$

The distance $Z_i$ to the image of the object when using Method-2 can be determined in a similar fashion by substituting h=(ef)/(2V), and t=(Ce)/V into the equation for $Z_i$ as follows:

$$Z_i = \frac{VeZ_o}{Mft - Z_o(2Mh - e)} = \frac{V^2 Z_o}{MfC - Z_o(Mf - V)},$$

$$\text{when } h = \frac{ef}{2V} \text{ and } t = \frac{Ce}{V}$$

Method-2 can be summarized as follows:
1) Setting horizontal shift h equal to $$h = \frac{ef}{2V}$$

2) Choosing a convergence distance C using some creative film making decisions—a likely choice will be the distance to the object of attention in the scene.
3) Setting camera interaxial $$t = \frac{Ce}{V}$$

One creative aspect of this approach (Method-2) is likely the perception of a "proportional object" at the convergence point. If the convergence point is selected to be the object of interest (which generally corresponds to the object in focus), then that object of interest at the convergence plane will have a "proportional" look, meaning that a cube would look like a cube rather than having a rectangular shape, or a head will look "normal" rather than a distorted ellipse or oval.

Using Method-2 would likely be helpful for a shot containing a human head at the convergence distance, or some other object that has a well-known shape according to the viewer. Additionally, Method-2 would likely be helpful if the shape of the object was somehow important to creative aspects of the story.

Additionally, with this method, objects that are not at the convergence plane may have shape distortion as specified by the Shape Ratio equation above or miniaturization/gigantism as specified by the 3D Width Magnification equation above.

Method 3a: 3D Width Magnification 1.0 at Convergence Plane, Fixed Convergence Distance, Variable Interaxial The goal of Method-3a is for the image of the object at the convergence plane to have a 3D width magnification value of 1.0. In order to derive the camera settings for this method, the value of the 3D width magnification of the image of the object at the convergence distance C must be derived by substituting the convergence distance C for the object distance $Z_o$, $Z_o$=C=(t*f)/(2*h) into the 3D width magnification equation as follows:

$$M_{W3D} = \frac{Mef}{Mft - Z_o(2Mh - e)}$$

$$M_{W3D}(Z_o = C) = \frac{Mef}{Mft - \frac{tf}{2h}(2Mh - e)} = \frac{M2h}{t}$$

Note that the equation $M_{W3D}(Z_o=C)=(M2h)/t$ is the value of the 3D Width Magnification of the image of the object at the convergence plane for any parallel camera setup method—it is not limited to this particular Method-3a. It turns out that the value of the 3D Width Magnification and the value of the 2D Width Magnification are equal at the convergence distance, which can be verified by substituting the convergence distance $Z_o$=C=(t*f)/(2*h) into the equation for 2D Width Magnification as follows:

$$M_{W2D} = \frac{Mf}{Z_o}$$

$$M_{W2D}(Z_o = C) = \frac{Mf2h}{tf} = \frac{M2h}{t}$$

Because the value of $M_{W3D}$ at the convergence plane is a function of both camera parameters h and t, there are actually two ways to proceed with this derivation, either by solving for t or h while $M_{W3D}$ is fixed at 1.0. In this Method-3a, the next step will be to solve for the value of h that achieves a 3D Width Magnification of 1.0 at the convergence plane as follows:

$$M_{W3D}(Z_o = C) = \frac{M2h}{t}$$

$$1 = \frac{M2h}{t}$$

$$h = \frac{t}{2M}$$

The next step is to substitute this value of h into the convergence distance equation as follows:

$$C = \frac{tf}{2h} = \frac{tf2M}{2t} = Mf$$

Unlike other methods disclosed here, in Method-3, the convergence distance C is fixed and is equal to the C=Mf for any interaxial t that is chosen. This indicates that the interaxial t in Method-3a can be chosen as a creative decision.

Because the camera parameter h is determined analytically for this method, the shape ratio and 3D width magnification achieved by this Method-3a can be analyzed. Substituting the value of the h=t/2M into the shape ratio equation leads to the following:

$$S = \frac{Vr}{Mft - Z_o(2Mh - e)} = \frac{Vt}{Mft - Z_o\left(2M\frac{t}{2M} - e\right)}$$

$$S = \frac{Vt}{Mft - Z_o(t - e)}, \text{ when } h = \frac{t}{2M}$$

Substituting the value of h=t/2M into the 3D width magnification equation leads to the following:

$$M_{W3D} = \frac{Mef}{Mft - Z_o(2Mh - e)}$$

$$= \frac{Mef}{Mft - Z_o\left(2M\frac{t}{2M} - e\right)} M_{W3D}$$

$$= \frac{Mef}{Mft - Z_o(t - e)},$$

when $h = \frac{t}{2M}$.

The image of the object distance $Z_i$ when using Method-3a can be solved for in a similar fashion by substituting h=t/2M into the equation for $Z_i$ as follows:

$$Z_i = \frac{VeZ_o}{Mft - Z_o(2Mh - e)}$$

$$= \frac{VeZ_o}{Mft - Z_o\left(2M\frac{t}{2M} - e\right)} Z_i$$

$$= \frac{VeZ_o}{Mft - Z_o(t - e)},$$

when $$h = \frac{t}{2M}$$

Method-3a can be summarized as follows:

1) Choosing an interaxial distance t using some creative film making decisions, perhaps based on variation in Shape Ratio S and 3D Width Magnification $M_{W3D}$ given above.

2)

$$h = \frac{t}{2M}$$

Setting horizontal shift h equal to

3) Convergence distance C is fixed and equal to C=Mf.

One creative aspect of Method 3a is likely the perception of a "realistically sized object" at the convergence point. To clarify, the width of the image of the object will appear as it did on set. One potential challenge with this method is that the convergence distance C is fixed. Therefore, if the convergence point is important to the film maker, then the focal length of the camera lens can be modified if using a zoom lens, or the camera position can be modified if using a prime lens. In either case, if it is desired that the object of attention is in the convergence plane, then the object of attention must equal the convergence distance, in other words $Z_o$=C=Mf.

Method 3b: 3D Width Magnification 1.0 at Convergence Plane, Fixed Convergence Distance, Variable Horizontal Shift h The goal of Method-3b is for the image of the object at the convergence plane to have a 3D width magnification value of 1.0. As in Method-3a, in order to derive the camera settings for this method, the value of the 3D width magnification of the image of the object at the convergence distance C must be derived by substituting the convergence distance C for the object distance $Z_o$, $Z_o$=C=(t*f)/(2*h) into the 3D width magnification equation resulting in the following:

$$M_{W3D}(Z_o = C) = \frac{M2h}{t}$$

Because the value of $M_{W3D}$ at the convergence plane is a function of both camera parameters h and t, there are actually two ways to proceed with the derivation, either by solving for t or h while $M_{W3D}$ is fixed at 1.0. In Method-3b, the next step will be to solve for the value of t that achieves a 3D Width Magnification of 1.0 at the convergence plane as follows:

$$M_{W3D}(Z_o = C) = \frac{M2h}{t}$$

$$1 = \frac{M2h}{t}$$

$$t = 2Mh$$

The next step is to substitute this value of h into the convergence distance equation as follows:

$$C = \frac{tf}{2h} = \frac{2Mhf}{2h} = Mf$$

Unlike other method described herein, the convergence distance C is fixed and is equal to the C=Mf for any horizontal shift h that is chosen. This indicates that the horizontal shift h in Method-3b can be chosen as a creative decision.

Now that the camera parameter t has been determined analytically for this method, the shape ratio and 3D width magnification achieved by Method-3b can be analyzed. Substituting the value of the t=2Mh into the shape ratio equation leads to the following:

$$s = \frac{Vt}{Mft - Z_o(2Mh - e)}$$
$$= \frac{V2Mh}{Mf2Mh - Z_o(2Mh - e)}$$
$$= \frac{V2Mh}{Mf2Mh - Z_o 2Mh + Z_o e}$$
$$S = \frac{Vt}{2Mh(Mf - Z_o) + Z_o e}, \text{ when } t = 2Mh$$

Substituting the value of t=2Mh into the 3D width magnification equation leads to the following:

$$M_{W3D} = \frac{Mef}{Mft - Z_o(2Mh - e)} = \frac{Mef}{Mf2Mh - Z_o(2Mh - e)}$$
$$M_{W3D} = \frac{Mef}{2Mh(Mf - Z_o) + Z_o e}, \text{ when } t = 2Mh$$

The image of the object distance $Z_i$ when using Method-3b can be solved in a similar fashion by substituting the t=2Mh into the equation for $Z_i$ as follows:

$$Z_i = \frac{VeZ_o}{Mft - Z_o(2Mh - e)} = \frac{VeZ_o}{Mf2Mh - Z_o(2Mh - e)}$$
$$Z_i = \frac{VeZ_o}{2Mh(Mf - Z_o) + Z_o e}, \text{ when } t = 2Mh$$

Method-3b can be summarized as follows:
1) Choosing a horizontal shift value h using some creative film making decisions, perhaps based on variation in Shape Ratio S and 3D Width Magnification $M_{W3D}$ given above.
2) Setting interaxial equal to t=2Mh.
3) Convergence distance C is fixed and equal to C=Mf.

Method 4: Interaxial is Set Equal to Interocular Distance, Horizontal Shift Sets the Convergence Distance Method 4 uses a fixed interaxial t set to the interocular eye separation e. Convergence distance is set by varying the horizontal shift h value. The convergence distance equation can be manipulated to solve for h as follows:

$$C = \frac{tf}{2h}$$
$$h = \frac{tf}{2C}$$

Substituting t=e used in Method-4, the value of h becomes $$h = \frac{ef}{2C}$$

The shape ratio of the image of the object at can be determined by substituting the value of h=(ef)/(2C) and t=e as used in Method-4 as follows:

$$s = \frac{Vt}{Mft - Z_o(2Mh - e)}$$
$$= \frac{Ve}{Mfe - Z_o(2Mh - e)}$$
$$= \frac{Ve}{Mfe - Z_o\left(2M\frac{ef}{2C} - e\right)}$$
$$= \frac{VC}{MfC - Z_o(Mf - C)}$$

In a similar fashion, the 3D Width Magnification can be computed by substituting the value of h=(ef)/(2C) and t=e as used in Method-4 as follows:

$$M_{w3D} = \frac{Mef}{Mft - Z_o(2Mh - e)}$$
$$= \frac{Mef}{Mfe - Z_o(2Mh - e)}$$
$$= \frac{Mef}{Mfe - Z_o\left(2M\frac{ef}{2C} - e\right)}$$
$$= \frac{MfC}{MfC - Z_o(Mf - C)}$$

$$Z_i = \frac{VeZ_o}{Mft - Z_o(2Mh - e)}$$
$$= \frac{VeZ_o}{Mfe - Z_o(2Mh - e)}$$
$$= \frac{VeZ_o}{Mfe - Z_o\left(2M\frac{ef}{2C} - e\right)}$$
$$= \frac{VCZ_o}{MfC - Z_o(Mf - C)}$$

In a similar fashion, the image of the object distance $Z_i$ can be computed by substituting the value of h=(ef)/(2C) and t=e as used in Method-4 as follows:

Method-4 can be summarized as follows:
1) Setting camera interaxial t equal to t=e
2) Choosing a convergence distance C using some creative film making decisions—likely choice will be the distance to the object of attention in the scene.
3) Setting horizontal shift h=(ef)/(2C)

One potential benefit of Method-4 is that a camera is not necessarily required to have variable interaxial t. In fact, it may be possible with some types of lenses and cameras to use a side-by-side camera configuration when using Method-4, which can lead to better exposures because there is no light-loss due to semi-transparent mirrors (in contrast to a beam-splitter camera rig). Better exposures generally lead to better image quality. Also, the side-by-side camera configurations also often tend to be smaller than the large beam-splitter rigs that are typically required when using small interaxial settings.

Method-4 may be similar to a method used by many IMAX-3D films that use a Solido camera with fixed interaxial (but with t=72.4 mm instead of t=e=65 mm) and non-converging lens designs. One exception is that with traditional IMAX-3D films, the horizontal shift h is applied during theatrical projection and therefore the convergence distance C is not varied from a creative point of view from scene to scene unless the lens focal length is changed.

EXAMPLES

Example-1—Camera Parameters Using Method-1, Method-2, Method-3 and Method-4

For this Example-1 (to be shown in the theatrical viewing environment), the film is being shot with a camera that uses a 4-Perf 2.39:1 film format sensor, which exposes an area on the film negative (or equivalently sized CCD or CMOS sensor) that has a width equal to 22 millimeters. Due to the 2:1 anamorphic lens used with the 4-perf 2.39:1 format, the physical sensor width $W_c$ used in the formula's disclosed herein must be multiplied by two, giving the 4-Perf 2.39:1 sensor an effective width of $W_c$=44.0 mm. The focal length of the camera lens is f=75 mm. Therefore, the camera's field of view is approximately equal to $2*\arctan((W_c/2)/f)$=33 degrees.

The image is projected on a screen that is 30 feet wide, e.g. the screen width $W_s$=30 feet=9144 mm. In this example, the magnification factor M has a value of $M=W_s/W_c$=9144 mm/44.0 mm=207.82. The viewer is sitting 3 screen heights from the 2.39:1 aspect ratio screen, which makes the viewing distance V=37.657 feet=11478 mm. This indicates that the viewer's field of view is approximately $2*\arctan((W_s/2)/V)$=43 degrees.

Figure 12:
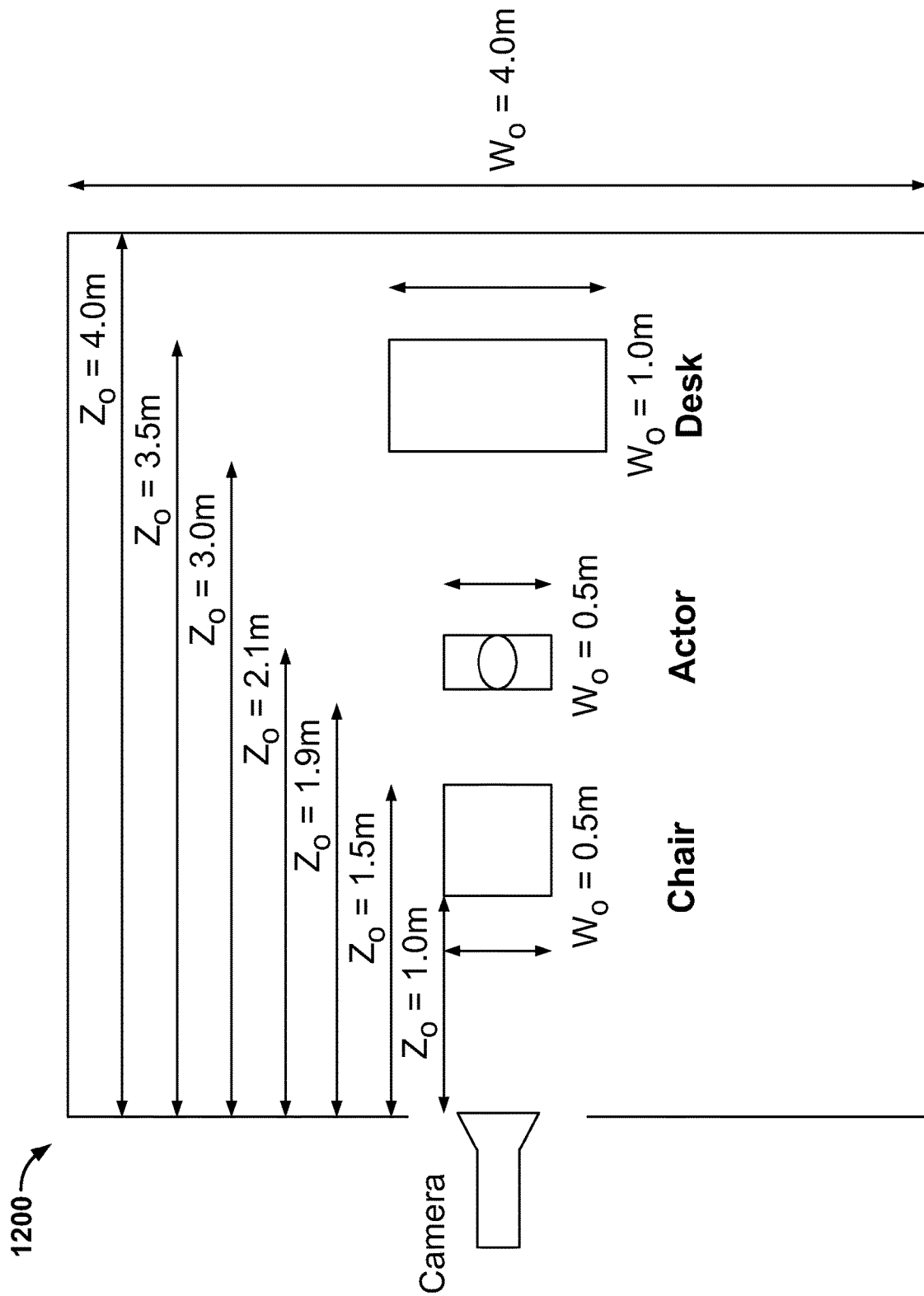
FIG. 12 shows a view of a scene used in Example-1 and Example-2.

A plan view of the scene 1200 is show in FIG. 12. The scene 1200 may, for example, take place indoors and include the main character of the film speaking in the center of the room that is 4 meters wide and 4 meters deep. The camera is pointed through the doorway of the room toward the actor standing in the middle of a room and therefore the camera is positioned 2 meters from the actor ($Z_o$=2.0 m), and the back wall of the room is 4 meters from the camera ($Z_o$=4.0 m). Assume the width of the actor's face is 6 inches=152 mm, and the depth of the actor's head and body is 8 inches=203 mm. Assume that the actor's body is 0.5 m wide. Assume there is a desk behind the actor that is 0.5 m deep and 1 m wide, with the front of the desk is positioned 3.0 m from the camera. Additionally, assume there is a chair in front of the actor that has width and depth of 0.5 m, and the front of the chair is 1.0 m from the camera.

For the methods that allow a creative choice of the convergence distance C, the convergence distance C is selected to be equal to C=2000 mm which corresponds to the middle of the actor's body.

Using Method-1, the value of h would be h=e/2M=65 mm/(2*207.82)=0.1564 mm. If the imaging sensors are fixed and instead of a horizontal shift of the sensor, an HIT is performed after acquisition, then this particular value of h is equivalent to a HIT shift of $h/W_c$=0.1564 mm/44.0 mm=0.36% of the image width. If this is a 2K image, then this is equivalent to a horizontal pixel shift of 0.0036*2048 pixels=7 pixels per eye. Using Method-1, the interaxial can be determined by solving for t such that t=(C*e)/(f*M)= (2000 mm*65 mm)/(75 mm*207.82)=8.3 mm.

Using Method-2, the value of h would be h=(ef)/(2V)=(65 mm*75 mm)/(2*11478 mm)=0.2124 mm. Using Method-2, the interaxial would be t=(Ce)/V=(2000 mm*65 mm)/11478 mm=11.3 mm.

Method-3a and Method-3b generally will not work well in this type of setup because the convergence distance C is fixed in these methods to C=Mf. If the 75 mm lens is used, then C=207.82*75 mm=15587 mm, the back of the room is 4000 mm from the camera so this would put everything in front of the screen. Even if the lens was switched to a much wider angle, say f=28 mm, then C=207.82*28 mm=5819 mm would still be outside of the room.

Using Method-4, the value of h would be h=(ef)/(2C)=(65 mm*75 mm)/(2*2000 mm)=1.2188 mm. Interaxial tin Method-4 is fixed at t=e=65 mm.

Figure 13:
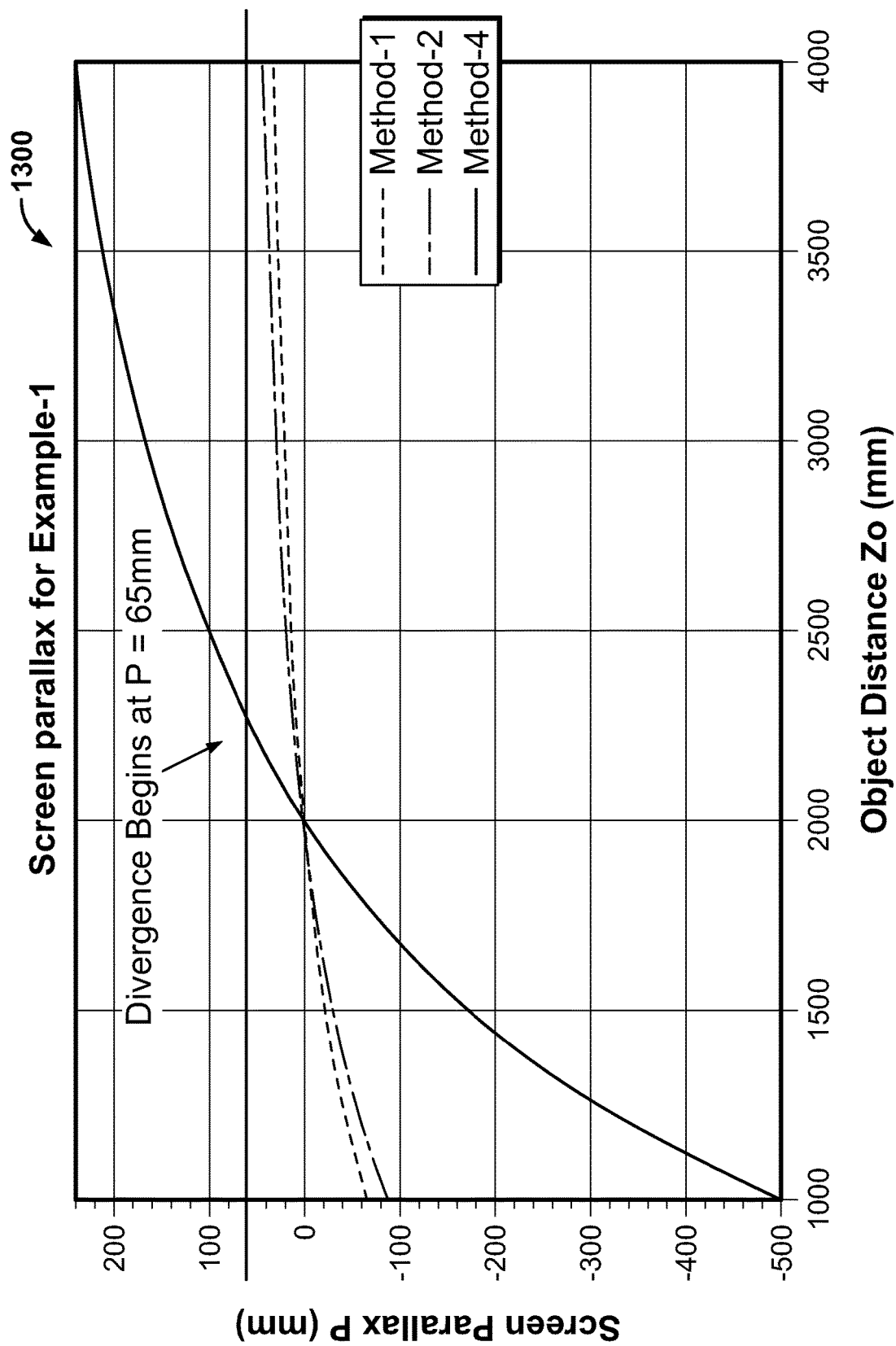
FIG. 13 shows Screen Parallax computed for Example-1.

FIG. 13 includes a graph 1300 that shows the screen parallax that results from the use of each method for the various object distances $Z_o$. In this figure, the screen parallax resulting from using Method-4 goes above 65 mm starting around $Z_o$=2300 mm. This is the point at which the eyes will start to diverge. While some divergence is tolerable, it is likely that exposure to significant amounts of divergence results in eye strain and viewer fatigue. One approach that could be used in this case when using Method-4 to avoid the potential problems caused by divergence is to set up the camera such that the points causing divergence are out of focus, i.e. use a shallow depth of field. This is often accomplished by using a larger aperture setting while exposing the negative or sensor.

Figure 14:
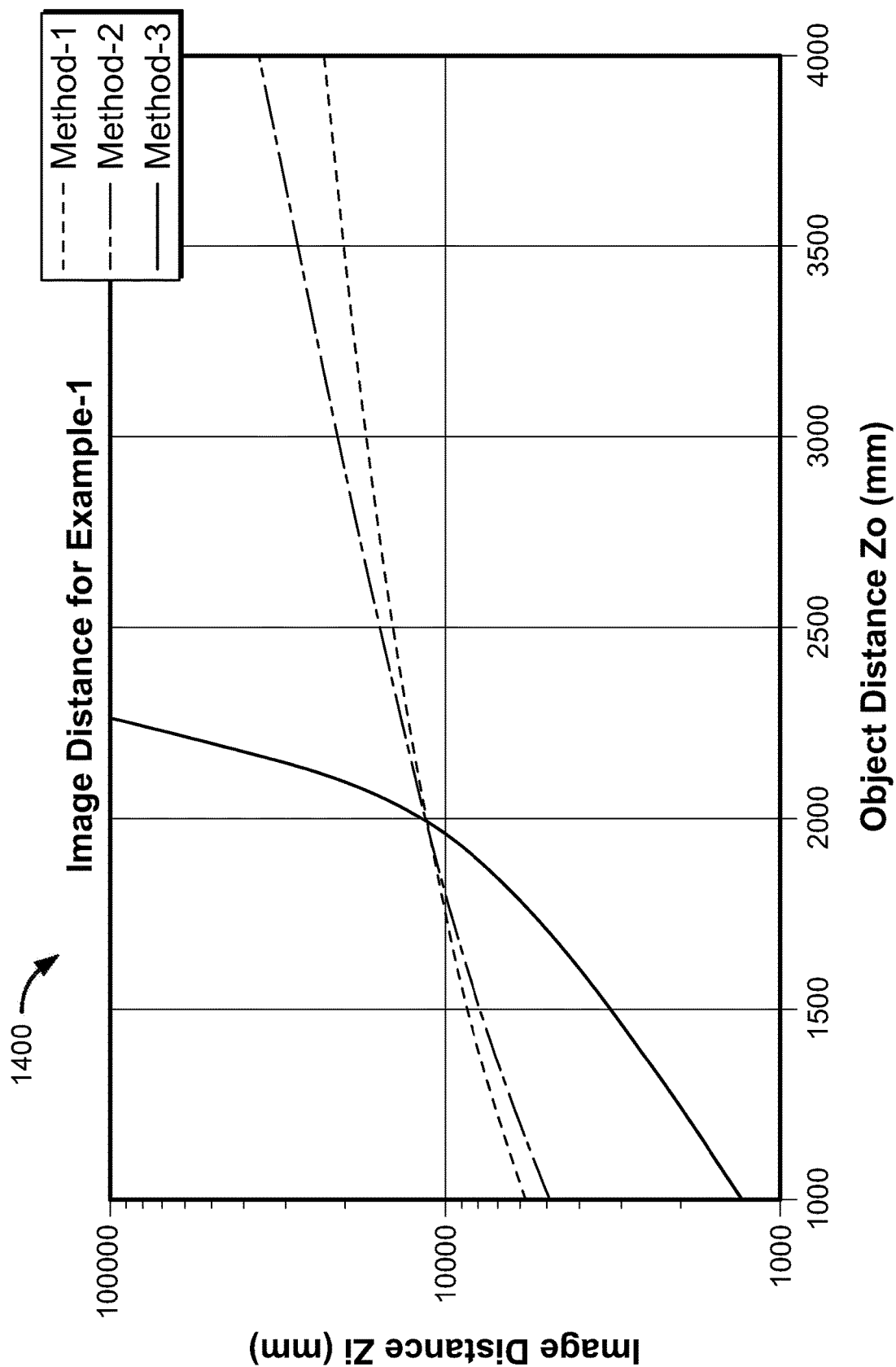
FIG. 14 shows Image Distance computed for Example-1.
Figure 15:
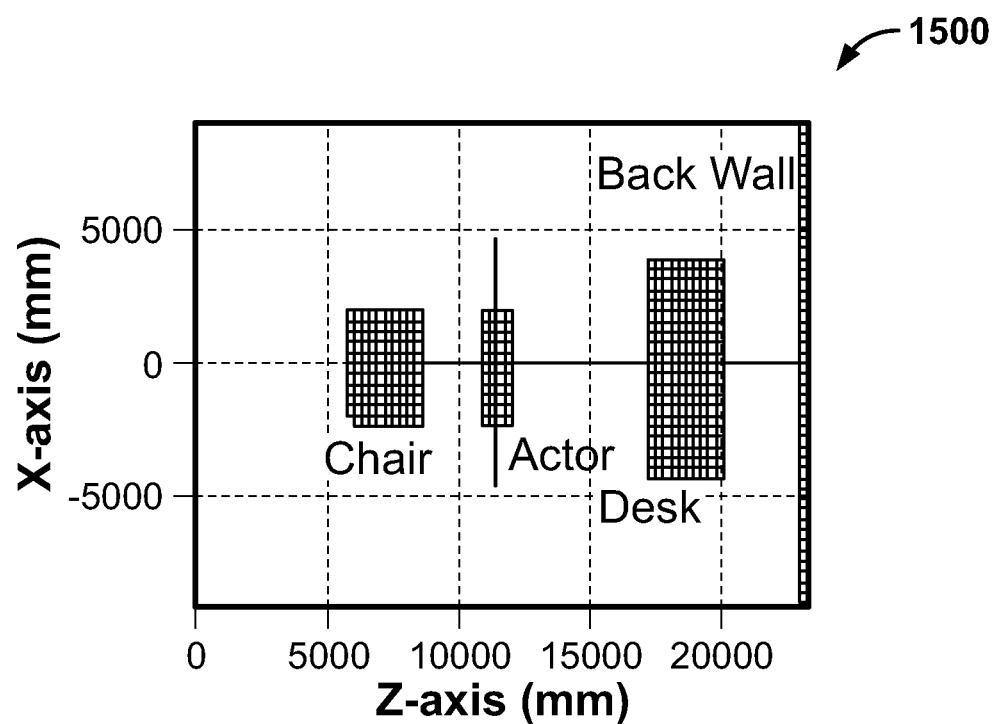
FIG. 15 shows a graph of $X_i$ vs. $Z_i$ for Example-1 Using Method-1.
Figure 16:
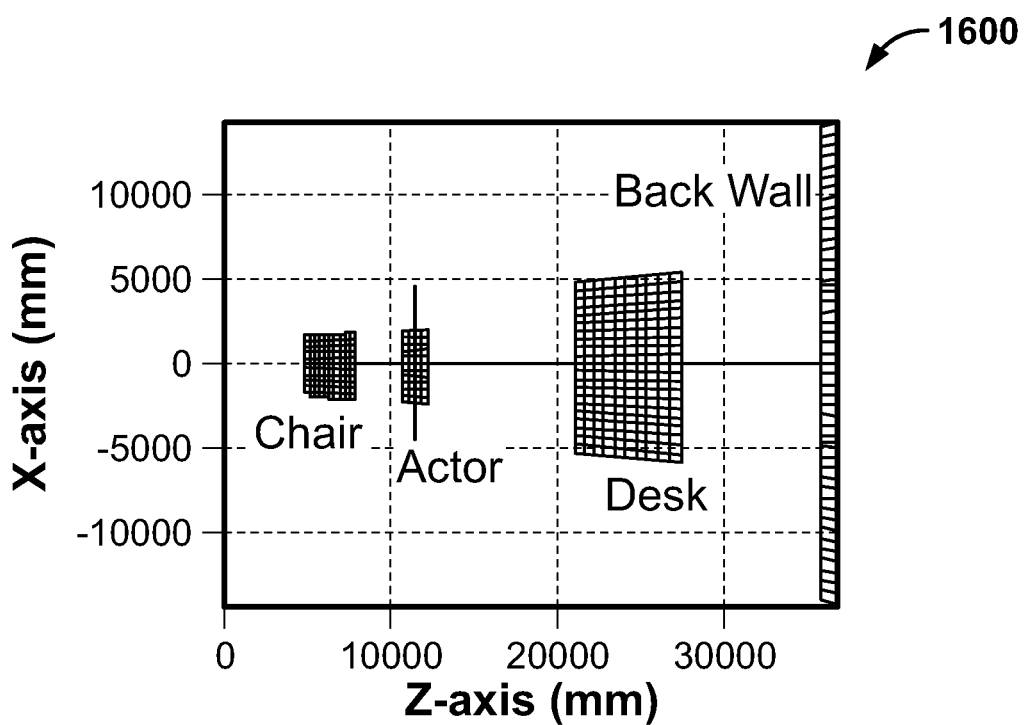
FIG. 16 shows a graph of $X_i$ vs. $Z_i$ for Example-1 using Method-2.
Figure 17:
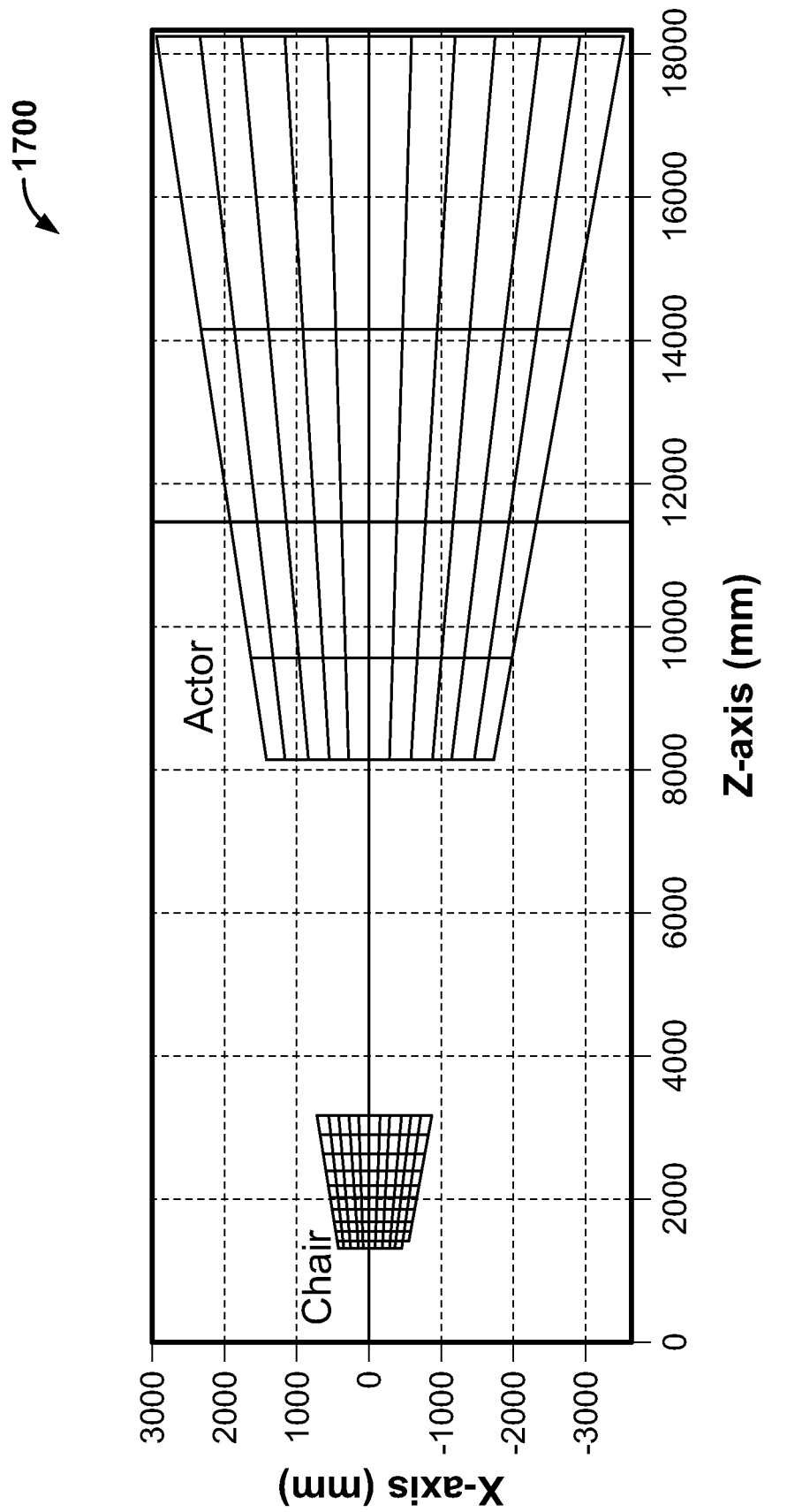
FIG. 17 shows a graph of $X_i$ vs. $Z_i$ for Example-1 using Method-4.

FIG. 14 includes a graph 1400 that shows the distance to the image of the object for Method-1, Method-2 and Method-4. The objects in the screen plane shown in FIG. 14 appear at $Z_i$=V=11478 mm. Another way of visualizing the perceived 3D image width and distance to the image of the object is to plot the transformed values of X and $Z_i$ resulting from the 3 methods used in Example-1, which are shown in the graphs 1500, 1600 and 1700 included in FIGS. 15, 16 and 17, respectively. As previously discussed, Method-3a and Method-3b generally will not work for the setup in Example-1.

Figure 18:
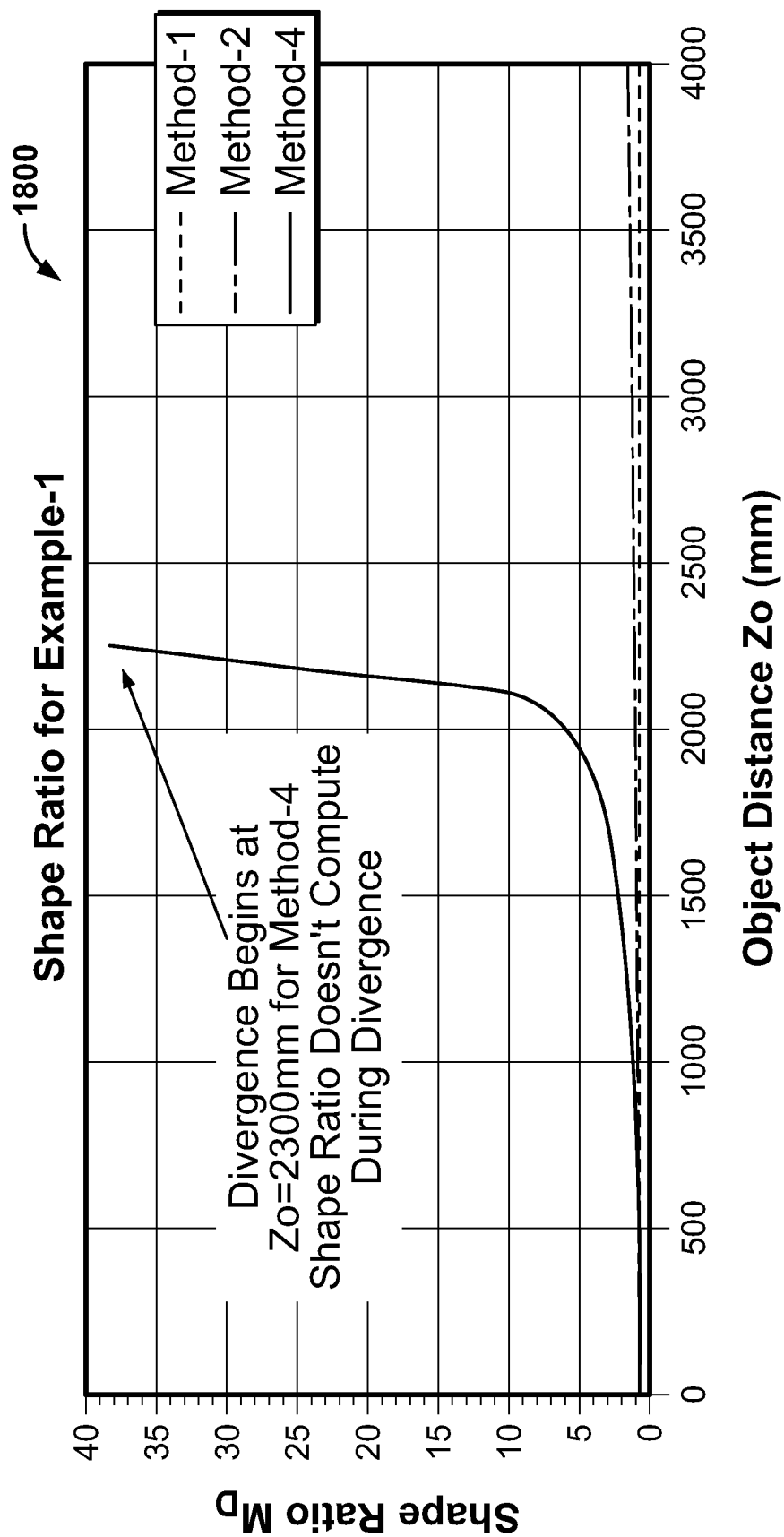
FIG. 18 shows a graph of Shape Ratio computed for Example-1.
Figure 19A:
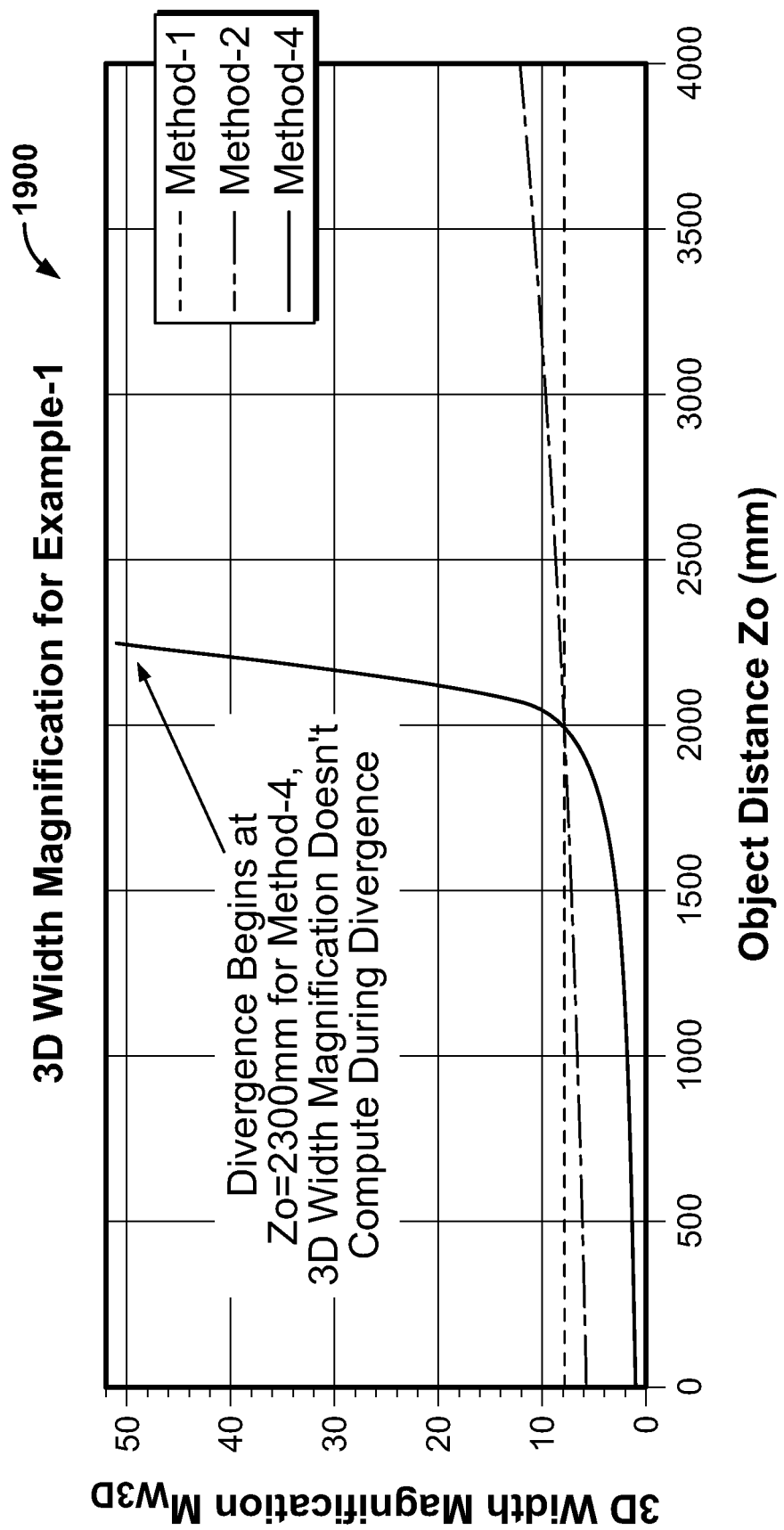
FIG. 19A shows a graph of 3D Width Magnification computed for Example-1.

FIG. 18 includes a graph 1800 that shows the shape ratio that would be achieved for Method-1, Method-2 and Method-4 in this particular scene. FIG. 19A includes a graph 1900 that shows the 3D Width Magnification that would be achieved for Method-1, Method-2 and Method-4 in this particular scene.

Table 1950 shown in FIG. 19B lists the values of the distance to the image of the object ($Z_i$) and the 3D Image Width ($W_{i3D}$) for several points in the scene used by Example-1 for the Method-1, Method-2 and Method-4. These numerical examples illustrate the change in apparent size and shape of the objects that occur at various object distances $Z_o$ in the scene using Method-1, Method-2 and Method-4.

Example-2—Camera Parameters Using Method-1, Method-2, Method-3 and Method-4

For Example-2, the same scene is used as in Example-1. However, a different film format and viewing environment is used (home entertainment viewing environment).

For Example-2, the film is being shot with a camera that uses a 5-Perf 65 mm film format sensor (also known as 5/70), which exposes an area on the film negative (or equivalently sized CCD or CMOS sensor) that has a width equal to 52.48 millimeters, so $W_c$=52.48 mm. As in Example-1, a 75 mm lens is used. This indicates that the camera's field of view is approximately 39 degrees.

In this example, the viewing environment is a 65-inch diagonal 3DTV, having an aspect ratio of 16:9. Therefore, the screen width $W_s$=1439 mm. The magnification factor can be computed as $M=W_s/W_c$=1439 mm/52.48 mm=27.42. Here, the viewer is approximately 6 feet from the television and therefore has a viewing distance of V=1829 mm. This indicates that the viewer's field of view is approximately 43 degrees.

As in Example-1, the methods will allow for a creative choice of the convergence distance C. Here, the convergence distance C is selected to be equal to C=2000 mm which corresponds to the middle of the actor's body.

Using Method-1, the value of h would be h=e/2M=65 mm/(2*27.42)=1.185 mm. If the imaging sensors are fixed and instead of a horizontal shift of the sensor, an HIT is performed after acquisition, then this particular value of h is equivalent to an HIT shift of $h/W_c$=1.185 mm/52.48 mm=2.26% of the image width. If this is a 1920×1080 pixel image, then this is equivalent to a horizontal pixel shift of 0.00226*1920 pixels=43 pixels per eye. Using Method-1, the interaxial can be determined by solving for t such that t=(C*e)/(f*M)=(2000 mm*65 mm)/(75 mm*27.42)=63.2 mm.

Using Method-2, the value of h would be h=(ef)/(2V)=(65 mm*75 mm)/(2*1829 mm)=1.3327 mm. Using Method-2, the interaxial would be t=(Ce)/V=(2000 mm*65 mm)/1829 mm=71.1 mm.

Method-3a and Method-3b would generally work well in this setup because the convergence distance C is fixed in these methods to C=Mf and happens to be C=27.42*75 mm=2057 mm. This value is extremely close the "creatively chosen" convergence distance of 2000 mm used in this example.

Using Method-3a, the value of t is a "creative decision", so t=50 mm for this example. Once t is chosen, h has value h=t/(2M)=50 mm/(2*27.42)=0.9117 mm.

Using Method-3b, the value of h is a "creative decision", so h=0.75 mm for this example. Once h is chosen, interaxial t has value t=2Mh=2*27.42*0.75 mm=41.1 mm.

Using Method-4, the value of h would be h=(ef)/(2C)=(65 mm*75 mm)/(2*2000 mm)=1.2188 mm. Interaxial tin Method-4 is fixed at t=e=65 mm.

Figure 20:
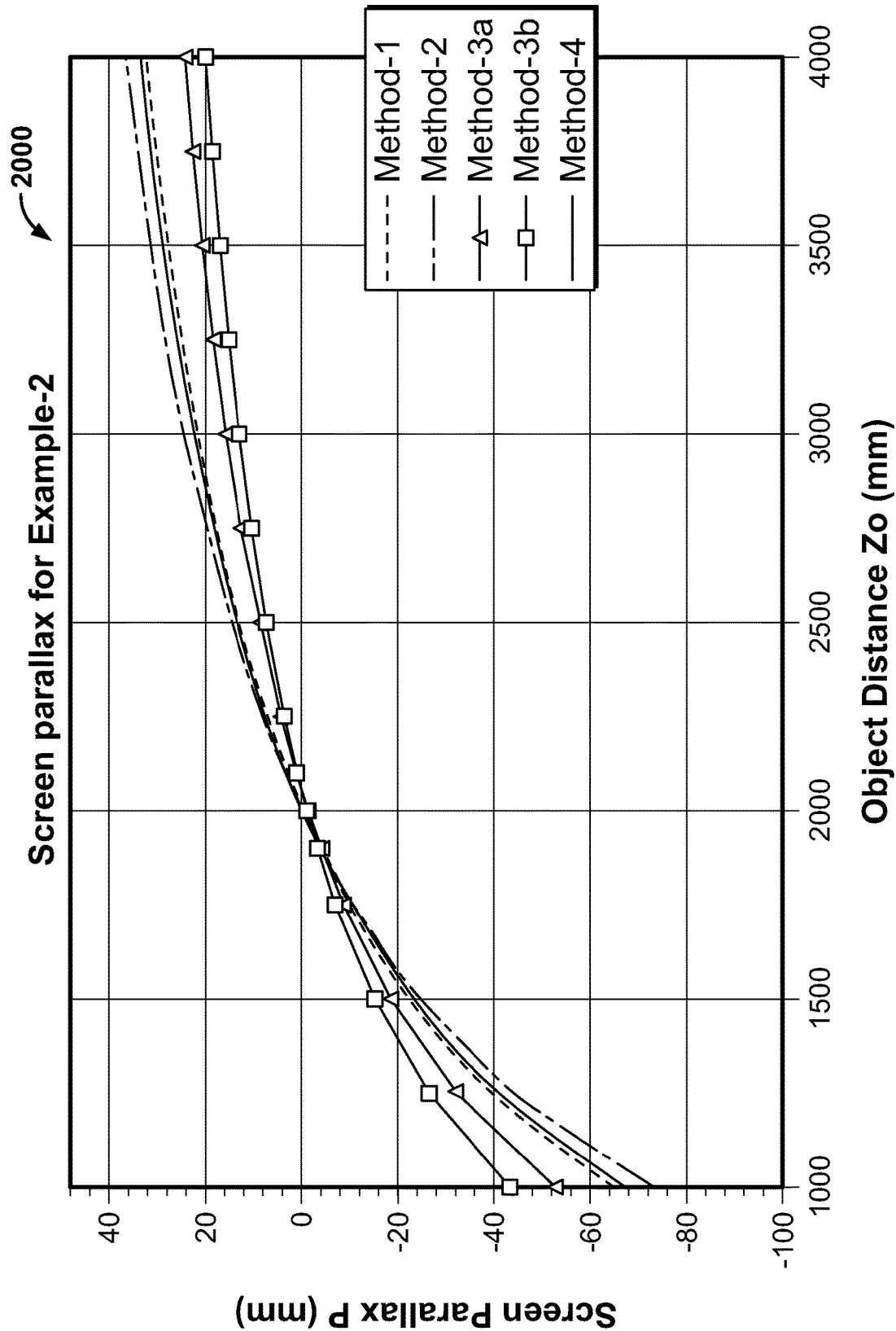
FIG. 20 shows a graph of Screen Parallax computed for Example-2.
Figure 21:
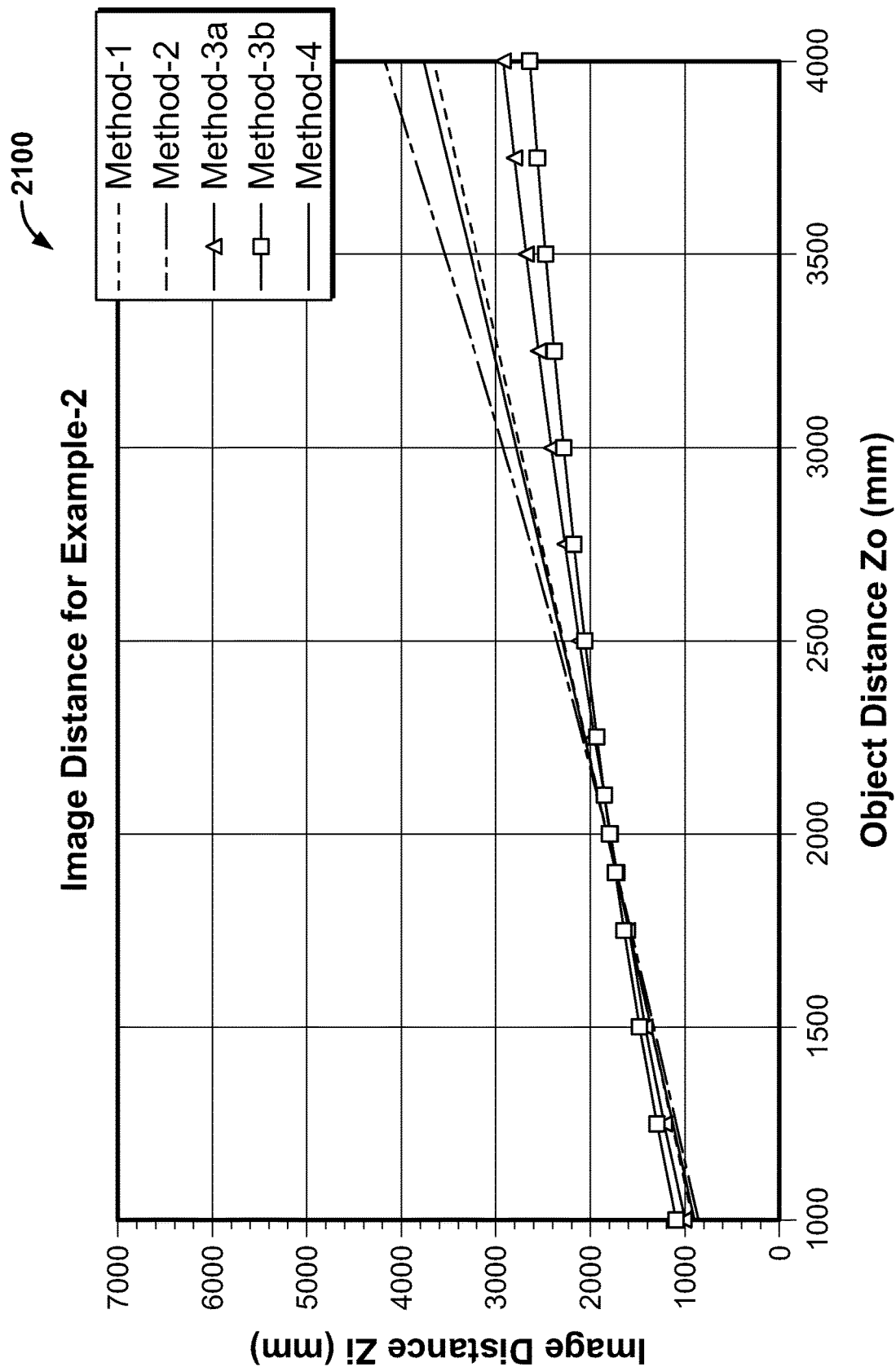
FIG. 21 shows a graph of Image Distance computed for Example-2.
Figure 22:
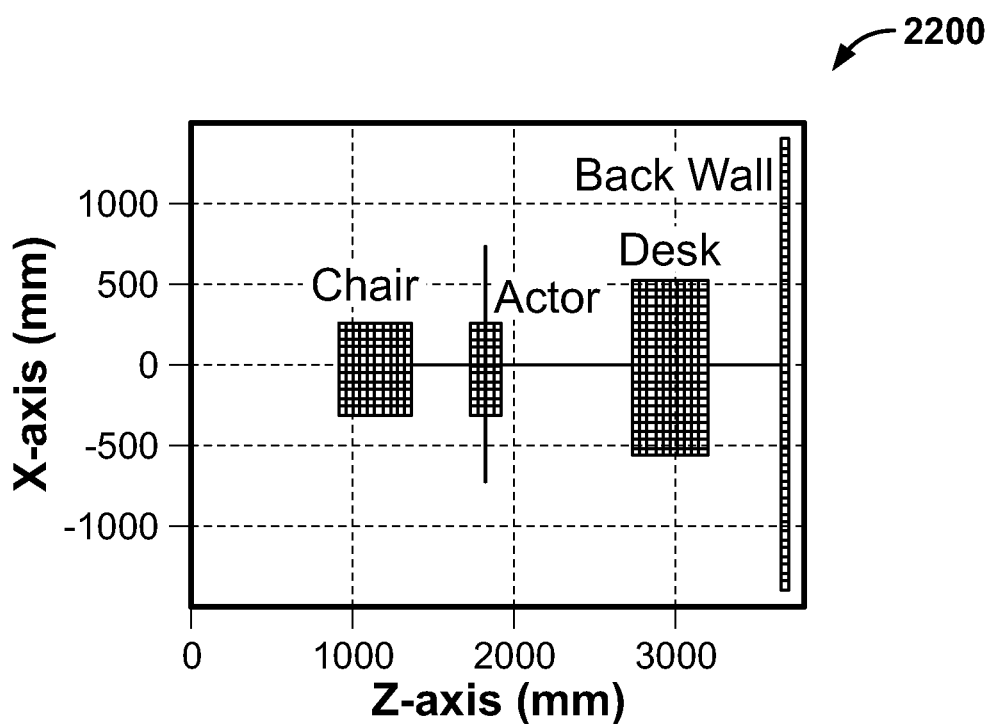
FIG. 22 shows a graph of $X_i$ vs. $Z_i$ for Example-2 using Method-1
Figure 23:
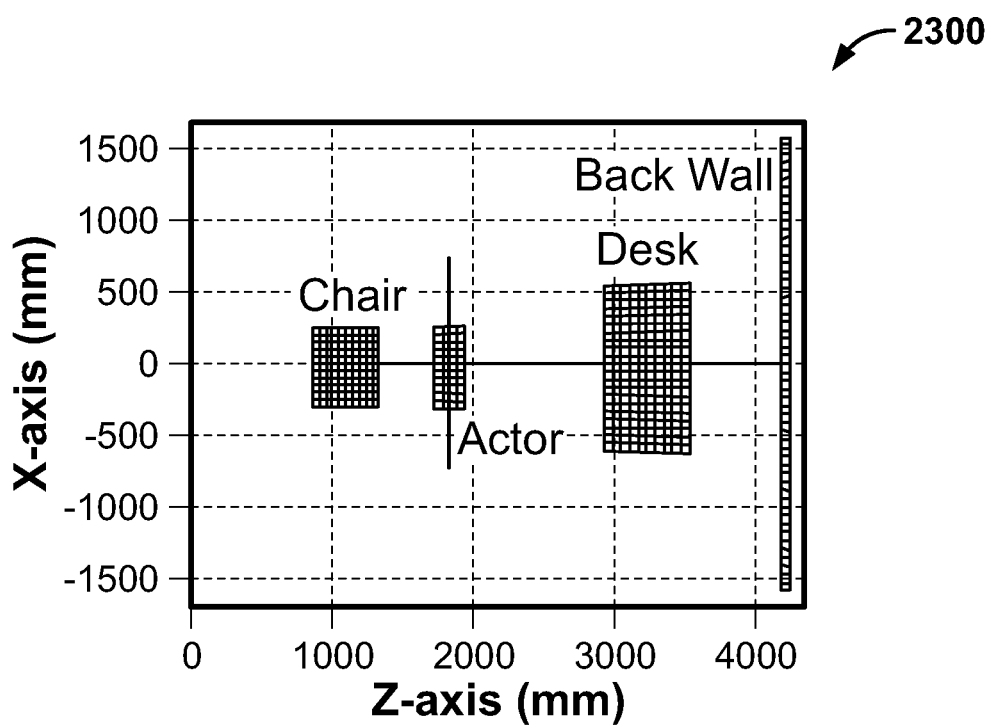
FIG. 23 shows a graph of $X_i$ vs. $Z_i$ for Example-2 using Method-2.
Figure 25:
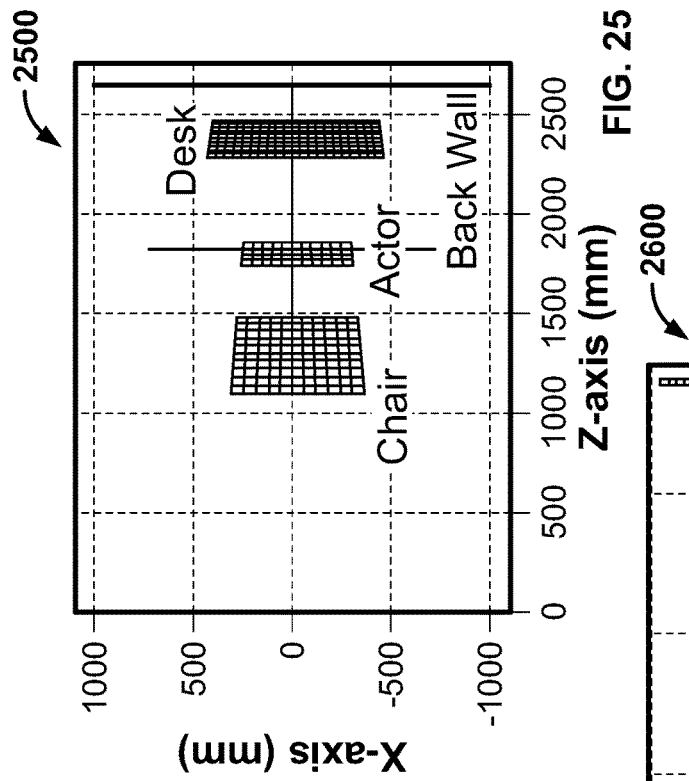
FIG. 25 shows a graph of $X_i$ vs. $Z_i$ for Example-2 using Method-3b
Figure 26:
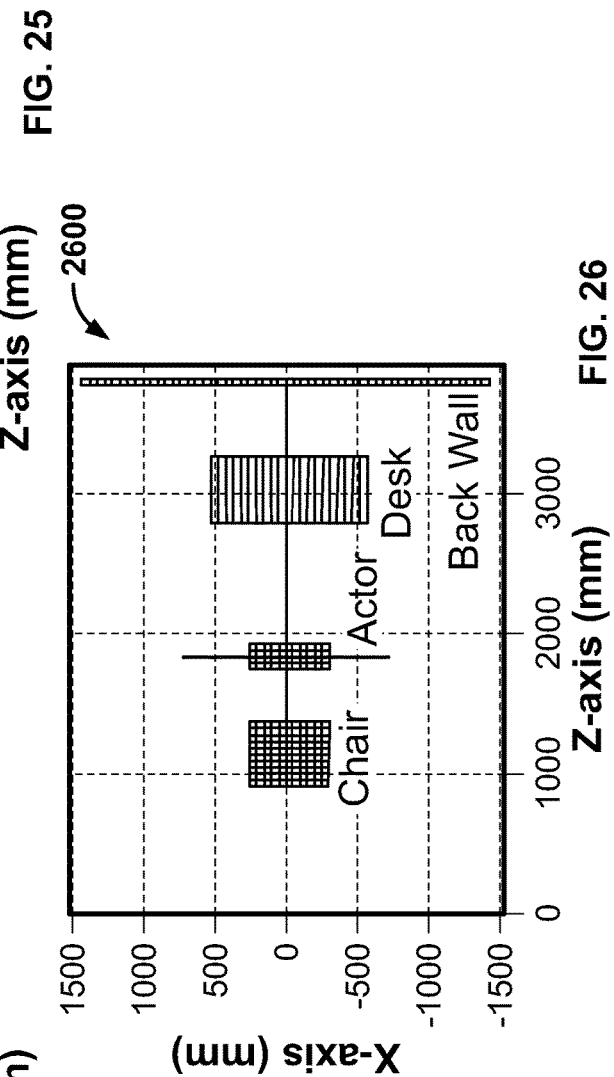
FIG. 26 shows a graph of $X_i$ vs. $Z_i$ for Example-2 using Method-4.
Figure 24:
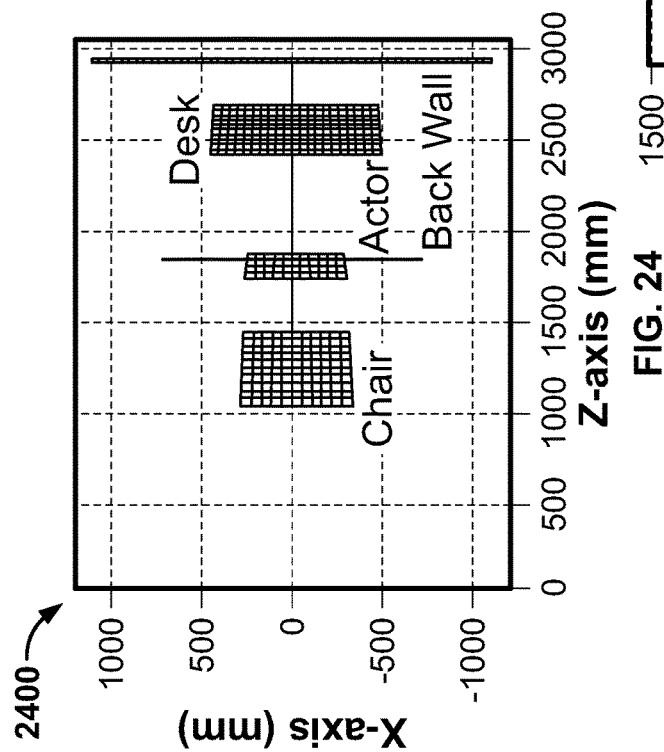
Figure 27:
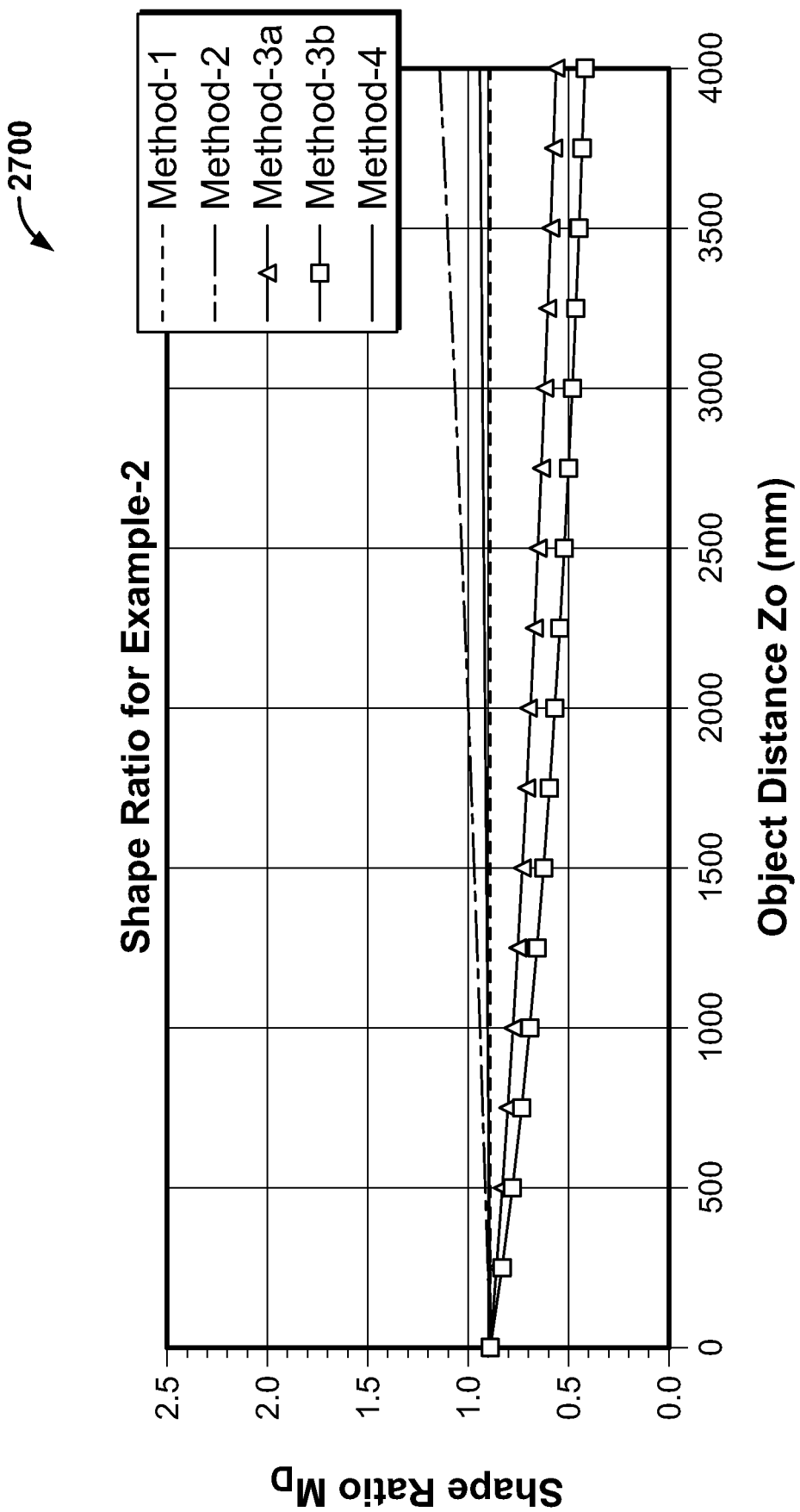
FIG. 27 shows a graph of Shape Ratio computed for Example-2.
Figure 28:
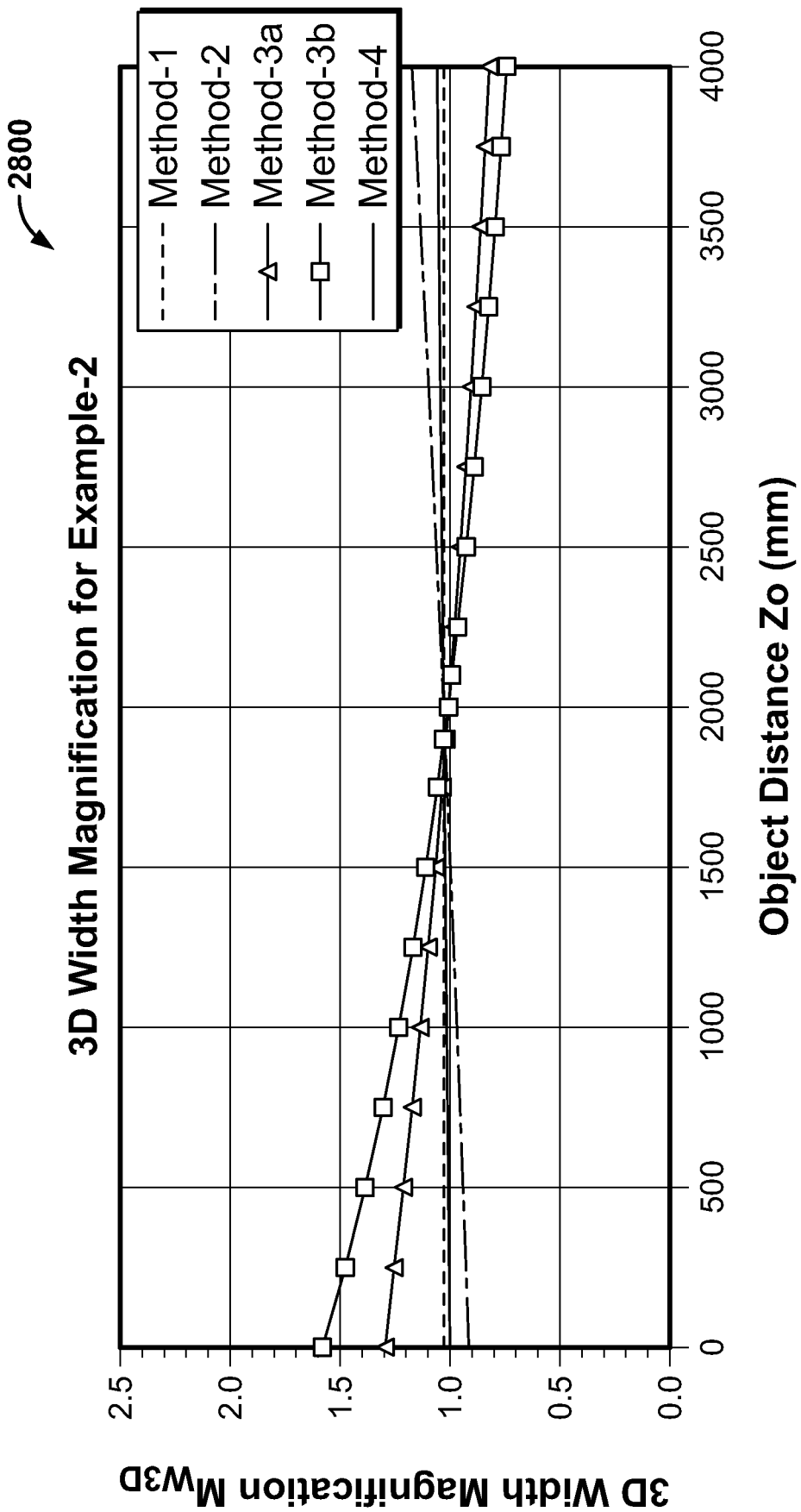
FIG. 28 shows a graph of 3D Width Magnification computed for Example-2.

FIG. 20 includes a graph 2000 that shows the screen parallax that result from the use of each method for the various object distances $Z_o$. FIG. 21 includes a graph 2100 that shows the distance to the image of the object Zi that results from the use of each method for the various object distances Zo. Note that objects that appear at the screen plane will have image distance Zi=V=1829 mm. FIG. 21 shows the distance to the image of the object Zi that results from the use of each method for the various object distances Zo. Note that objects that appear at the screen plane will have image distance Zi=V=1829 mm. As discussed in Example-1, another way of visualizing the perceived 3D image width and distance to the image of the object is to plot the values of Xi and Zi resulting from the 5 methods used in Example-2, which are shown in the graphs 2200, 2300, 2400, 2500 and 2600 of FIGS. 22-26, respectively. FIG. 27 includes a graph 2700 that shows the shape ratio that would be achieved for each method in this particular example scene. FIG. 28 includes a graph 2800 that shows the 3D Width Magnification that would be achieved for each method in this particular example scene.

Table 2900 shown in FIG. 29 lists the values of the distance to the image of the object ($Z_i$) and the 3D Image Width ($W_{i3D}$) for several key points in the scene used by Example-2 for each of the camera setup methods. These numerical examples illustrate the change in apparent size and shape of the objects that occur at various object distances $Z_o$ in the scene using the camera setup methods discussed previously.

Orthostereoscopic Conditions

As shown in Table 2900, for Example-2 the size and shape of the images of the objects produced by Method-1 and Method-4 closely match the size and shape of the actual physical objects on the set of the Example-2 scene. In other words $W_{i3D} \approx W_o$ and $Z_i \approx Z_o$. The reason for this close-to-reality representation of shape, size and perceived distance to the object is that the scene, camera and viewing parameters used in Example-2-Method-1 and Example-2-Method-4 are very close to those typically required to achieve the so-called "orthostereoscopic condition." When viewing stereoscopic content that is acquired and viewed such that the orthostereoscopic condition is achieved, the geometry of the images of the objects perceived by the viewer will be equivalent to the geometry of those same objects in reality on set in relation to the camera location.

For example, when the orthostereoscopic condition is achieved, the image of an object that was 2000 mm from the camera ($Z_o$=2000 mm) will be perceived to be 2000 mm from the viewer ($Z_i$=2000 mm). Additionally, when the orthostereoscopic condition is achieved, the image of the object that has a width of 152 mm ($W_o$=152 mm) on set will appear have an image width of 152 mm to the viewer ($W_{i3D}$=152 mm). Furthermore, when the orthostereoscopic condition is achieved, the equivalence between the geometry of objects in reality and the geometry of the images of objects as perceived by the viewer will exist for all objects in the scene at all distances from the camera.

For parallel cameras, the orthostereoscopic condition can be achieved by setting the camera and viewing environment parameters as follows:

1) Setting interaxial equal to interocular, t=e.
2) Setting the camera field-of-view equal to the viewer's field-of-view of the display, $(W_c/f)=(W_s/V)$ i.e. V=Mf.
3) Setting convergence distance equal to the viewing distance, C=V.

Substituting these three parameter values into the convergence distance equation allows one to solve for the horizontal shift h, as shown below:

$C=(t*f)/(2*h)$ set t=e $C=(e*f)/(2*h)$ set V=Mf→f=V/M $C=(e*V)/(2*M*h)$ set C=V $V=(e*V)/(2*M*h)$ $1=e/(2*M*h)$ $h=e/(2*M)$ In other words, for the parallel camera set up, the above conditions indicate that h=e/(2M).

While Example-2 comes close to achieving the orthostereoscopic condition using Method-1 and Method-4, it is likely that the orthostereoscopic condition cannot be achieved comfortably for all combinations of screen sizes and scene geometries. For example, to achieve the orthostereoscopic condition using the camera and viewing parameters specified in Example-1 would require a viewing distance and convergence distance of V=C=Mf=207.82*75 mm=15586 mm. If a 15586 mm convergence distance was used with the example scene, everything would be very far out in front of the screen (because the farthest object distance from the camera in the example scene is the back wall at 4000 mm) and the images would likely be uncomfortable to the viewer. Perhaps a different type of scene geometry would be appropriate to achieve the orthostereoscopic condition using camera and viewing parameters similar to Example-1. For example a scene with the object of interest at the orthostereoscopic convergence distance C=V=Mf=15586 mm would likely be a good candidate. A landscape view or view-from-above are two types of shots where the object of interest would likely be around 15586 mm (51.2 feet) from the camera.

Rules for Size and Shape Perception in 3D Imagery

Table 3000 shown in FIG. 30 illustrates a rule which allows for a quick estimate of the dependence of the 3D Width Magnification and Shape Ratio on the object distance $Z_o$ for given values of the horizontal image shift h. This is similar to the B=0, B+ and B− categorizations known in the art.

For Example-1, Method-1 is in Category A, Method-2 is in Category B and Method-4 is in Category B. For Example-2, Method-1 is in Category A, Method-2 is in Category B, Method-3a is in Category C, Method-3b is in Category C, and Method-4 is in Category B. If the stereoscopic content corresponds to Category A when viewed on a large screen, however, that same stereoscopic content will correspond to Category C when viewed on a smaller screen unless additional HIT is applied to the stereoscopic content.

Regardless of the methods utilized to create a 3D film, mathematical analyses similar to those performed in Methods 1-4 should help in evaluating whether the particular method used can meet the creative intent of the film maker. As a result of these types of analyses film makers and stereographers can make more informed decisions both on-set and in post production. Use of the methods, apparatuses, and media discloses herein will also remove the notion of 3D content creation as a 'black art' and potentially increase the efficiency of 3D content creation and distribution.

Further Examples

Figure 31:
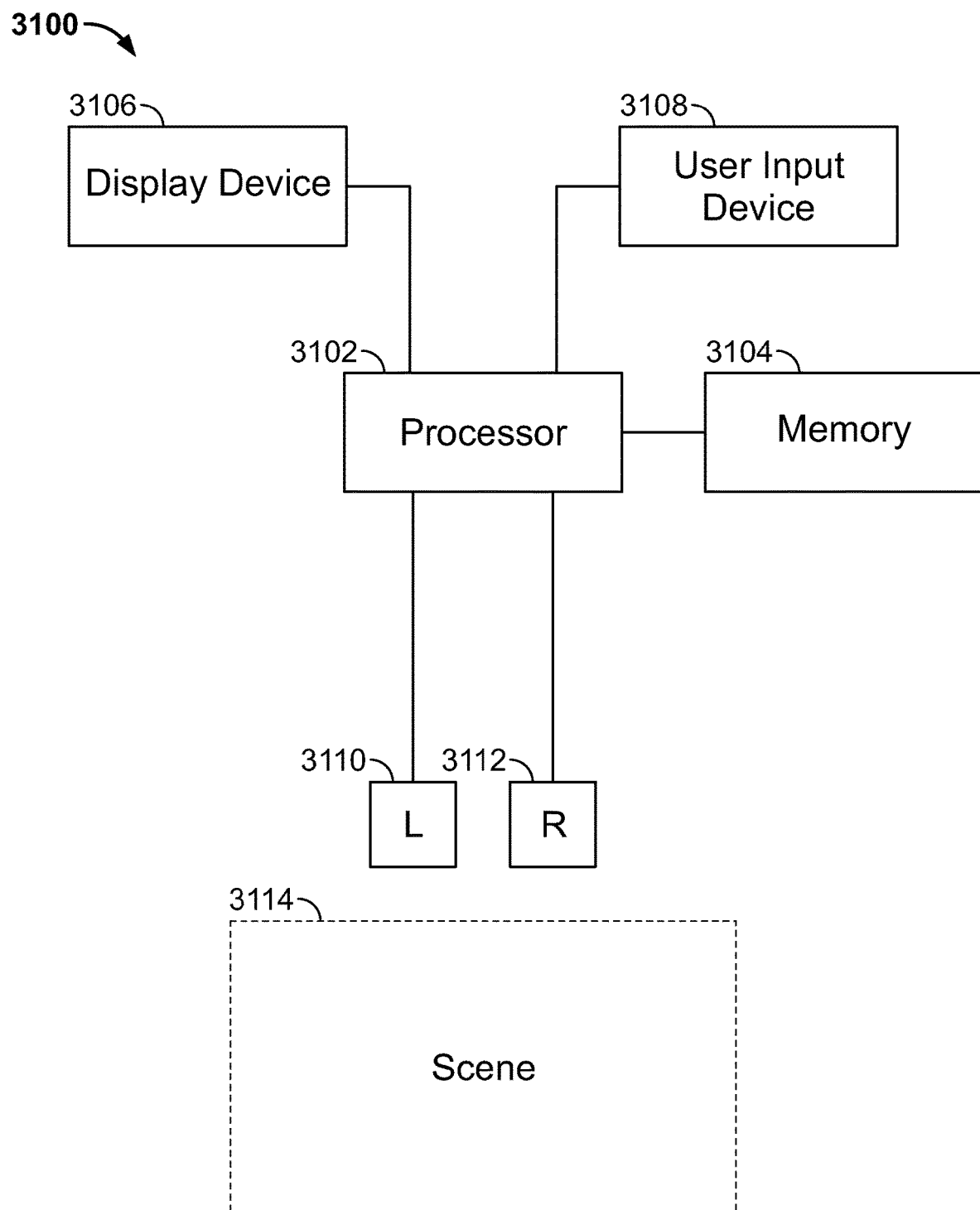
FIG. 31 is a schematic diagram illustrating a system and apparatus for controlling scene, camera and viewing parameters for altering perception of 3D imagery.

A method for stereography consistent with the foregoing disclosure may be performed by an apparatus or system 3100, as shown in FIG. 31. The system 3100 may include a processor 3102, which may include one or more sub-processors and/or microprocessors, for example, a central processing unit and a graphics processing unit. The processor 3102 may be coupled to a computer memory medium or device 3104, which may comprise one or multiple media or devices. The memory 3104 may comprise firmware or software including instructions for carrying out operations of the method for stereography. The memory may also hold data, for example digital image data, measurement data, or control data. The processor 3102 may also be coupled to a user input device 3108 or devices, including, for example, a keyboard, touchscreen, pointing device, camera, and/or microphone, for transforming user actions into electronic signals capable of being processed by the processor 3102. The processor may also be coupled to a display device 3106 for displaying a graphical user interface used for controlling processes performed by the processor 3102, or for displaying stereographic output from such processes.

The processor 3102 may also be coupled to a pair of stereoscopic cameras 3110, 3112 positioned for capturing video or motion picture images of a scene 3114. The camera pair may include a left camera 3110 including a left image sensor, and a right camera 3112 including a right image sensor, and other camera components as described elsewhere herein and/or otherwise known in the motion picture arts. Details of the camera setup may be, for example, as described above in connection with FIG. 1. The cameras 3110, 3112 and scene 3114 may comprise physical cameras positioned to capture images of a physical scene, such as, for example, a video production or motion picture set. In such cases, the coupling to the processor 3102 may be a direct electronic coupling, for example, a Universal Serial Bus (USB), Firewire, proprietary, or other wired or wireless interface. In an alternative, the coupling may be indirect; for example, the cameras 3110, 3112 may capture images to film, and the film may be scanned to produce digital image data provided from a scanner to the processor 3102. Conversely, the cameras 3110, 3112 may be controlled manually by human operators using control parameters provided by the processor 3102 via the display device 3106.

In alternative embodiments, the cameras 3110, 3112 and scene 3114 may comprise virtual objects modeled in a virtual reality environment. For example, the scene may be a three-dimensional modeled environment existing in the computer memory 3104 as a matrix of numerical values, as known in the art of electronic rendering and the like. The cameras 3110, 3112 may similarly be modeled as viewports for image capture in independent rendering operations carried out by the processor 3102. In that sense, the cameras 3110, 3112 and scene 3114 may be understood as existing in the combination of the processor 3102 and memory 3114.

Figure 32:
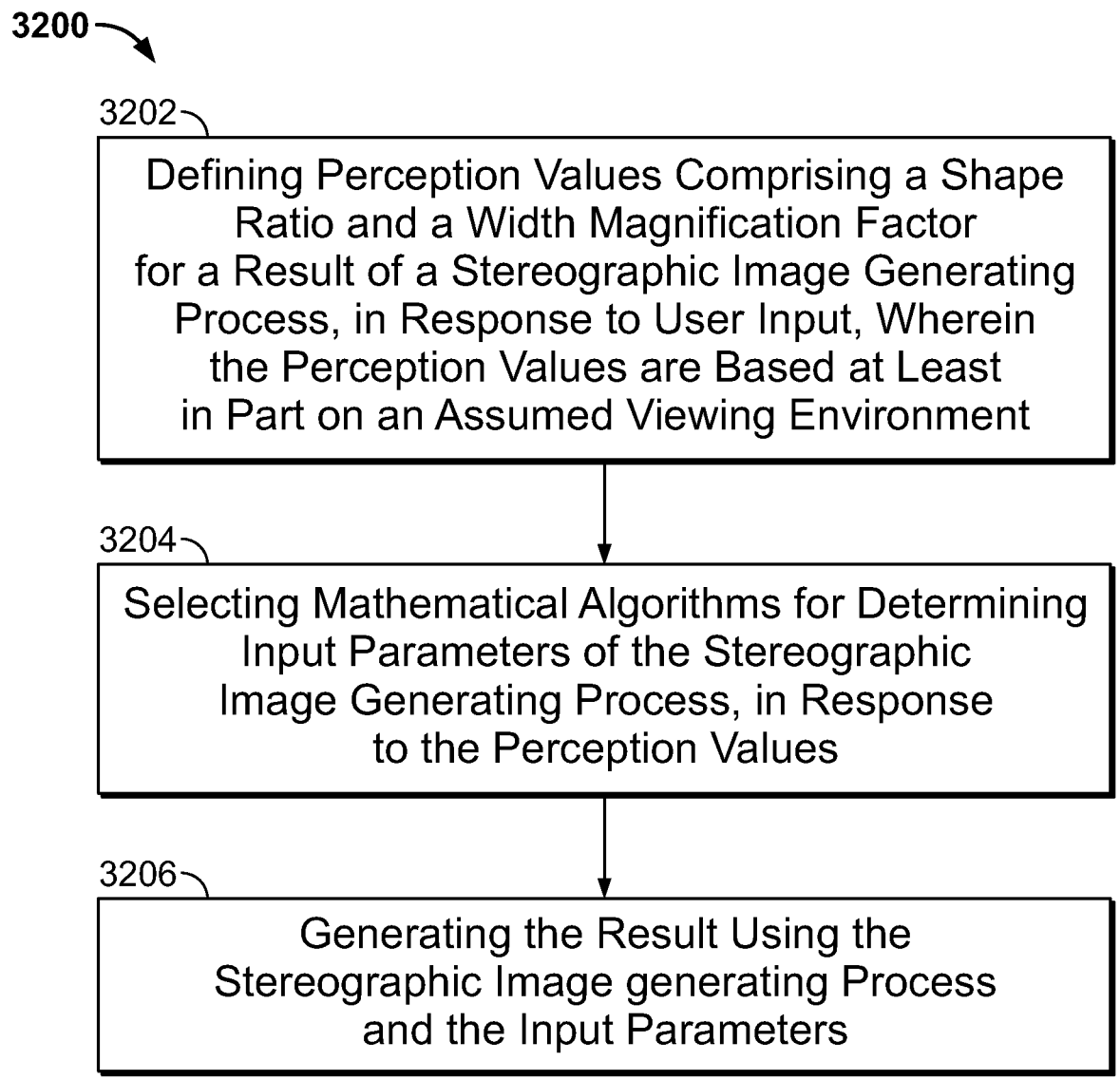
FIG. 32 is a flow chart illustrating aspects of a method for controlling scene, camera and viewing parameters for altering perception of 3D imagery.

As shown in FIG. 32, a stereography system 3100 may be used to perform a method 3200 for stereography. The method may include, at 3202, defining perception values comprising a shape ratio and a width magnification factor for a result of a stereographic image generating process, in response to user input, wherein the perception values are based at least in part on an assumed viewing environment. The assumed viewing environment may be defined, for example, by parameters as illustrated and described in connection with FIG. 2 herein. The shape ratio may be as shown and described in connection with FIG. 3 herein. The width magnification may be 2D or 3D, for example as described in connection with equations (7) and (9) herein. The perception values may be defined by a processor in response to user input, by obtaining values from a data base or other data structure. For example, a stereographic process may be initiated by a user for an expressly or impliedly selected viewing environment, which the system 3100 may adopt as the assumed viewing environment. The processor may then select or determine the perception values based on the assumed viewing environment, consistent with the more detailed examples and algorithms set forth herein above.

The method 3200 may further include, at 3204, selecting mathematical algorithms for determining input parameters of the stereographic image generating process, in response to the perception values. Examples of appropriate algorithms for determining input parameters in response to perception values are provided herein above, for example in connection with Example-1 and Example-2. The processor may determine the input parameters as illustrated by any one of the described Examples, or using a similar process.

The method 3200 may further include, at 3206, generating the result using the stereographic image generating process and the input parameters. The image generating process may be real or virtual. Accordingly, generating the result may include capturing stereographic images of a real scene using physical cameras set up according to the input parameters. For further example, in virtual embodiments, generating the results may include rendering a stereographic pair of images of a 3D modeled environment, based on the input parameters.

In addition, the method 3200 may include altering parameters of the assumed viewing environment to alter the result. For example, the method may include use of computer-implemented tool for interactively modifying scene parameters and/or the assumed viewing environment during a 2D-to-3D conversion process. Use of the tool may then trigger the re-rendering of the 3D content on the fly.

With reference to FIGS. 33-36, several additional operations 3300, 3400, 3500 and 3600 are depicted for performing a stereography method, for example using the system 3100. One or more of operations 3300, 3400, 3500 and 3600 may optionally be performed as part of method 3200. The elements 3300, 3400, 3500 and 3600 may be performed in any operative order, or may be encompassed by a development algorithm without requiring a particular chronological order of performance. Operations can be independently performed and are not mutually exclusive. Therefore, any one of such operations may be performed regardless of whether another downstream or upstream operation is performed. For example, if the method 3200 includes at least one of the operations 3300, 3400, 3500 and 3600, then the method 3200 may terminate after the at least one operation, without necessarily having to include any subsequent downstream operation(s) that may be illustrated.

Figure 33:
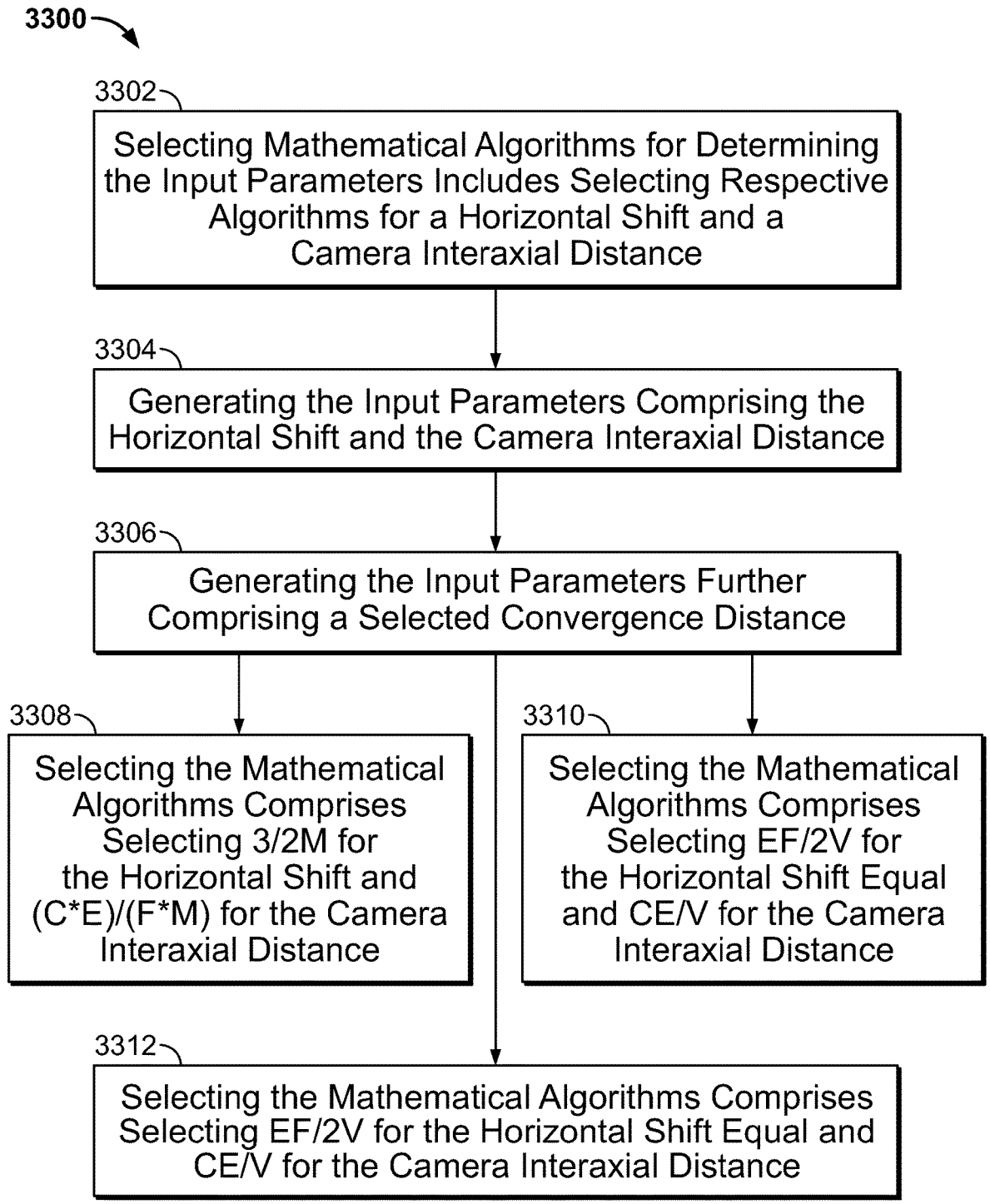
FIGS. 33-36 are flow charts illustrating further elements and aspects of methods for controlling scene, camera and viewing parameters for altering perception of 3D imagery.

In one embodiment, with reference to FIG. 33, selecting mathematical algorithms for determining the input parameters in the method 3200 may further include, at 3302 selecting respective algorithms for a horizontal shift and a camera interaxial distance. As noted, in some embodiments the stereographic image generating process may include capture of a real set using a stereographic camera rig. In such embodiments, the method 3200 may include configuring a pair of cameras for imaging the real set according to the horizontal shift and the camera interaxial distance.

In addition, generating the input parameters in the method 3200 may further include, at 3304, generating the input parameters comprising the horizontal shift and the camera interaxial distance. Also, generating the input parameters in the method 3200 may further include, at 3306 generating the input parameters further comprising a selected convergence distance.

In another aspect, selecting the mathematical algorithms in the method 3200 may include, at 3308, selecting $3/2M$ for the horizontal shift and $(C*e)/(f*M)$ for the camera interaxial distance. In an alternative aspect, selecting the mathematical algorithms in the method 3200 may include, at 3312, selecting $ef/2V$ for the horizontal shift equal and $Ce/V$ for the camera interaxial distance. In yet another aspect, selecting the mathematical algorithms in the method 3200 may include, at 3310, selecting "e" for the camera interaxial distance and $(ef)/(2C)$ for the horizontal shift. Selection between these alternatives may be performed in accordance with more detailed examples as set forth herein in connection with Example-1 and Example-2. The symbology referred in FIG. 33 is the same as used throughout the specification herein above.

Figure 34:
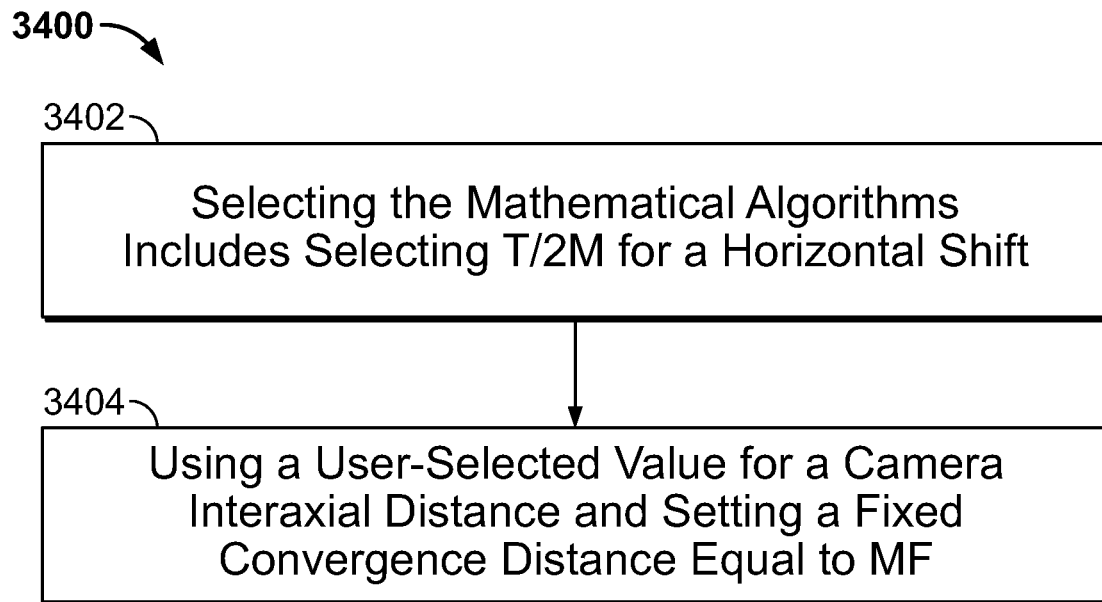

With reference to FIG. 34, in other aspects selecting the mathematical algorithms in the method 3200 may further include, at 3402, selecting $t/2M$ for a horizontal shift. In addition, the method may further include, at 3404, using a user-selected value for a camera interaxial distance and setting a fixed convergence distance equal to Mf. The symbology referred in FIG. 34 is the same as used throughout the specification herein above.

Figure 35:
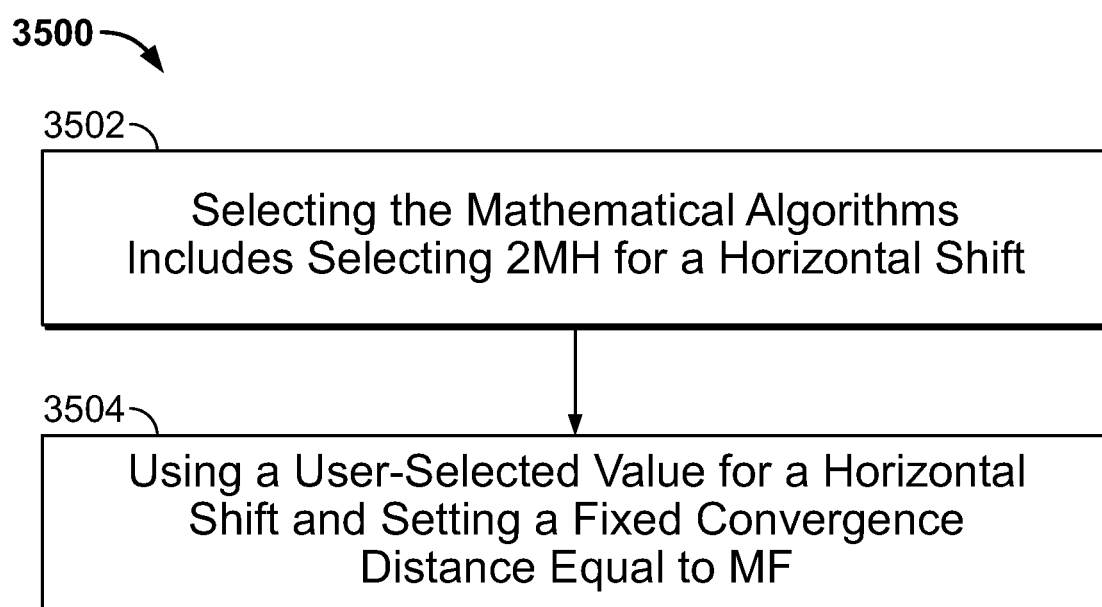

With reference to FIG. 35, in an alternative aspect, selecting the mathematical algorithms in the method 3200 may further include, at 3502, selecting 2Mh for a camera interaxial distance. In addition, the method may further include, at 3504, using a user-selected value for a horizontal shift and setting a fixed convergence distance equal to Mf. The symbology referred in FIG. 35 is the same as used throughout the specification herein above.

Figure 36:
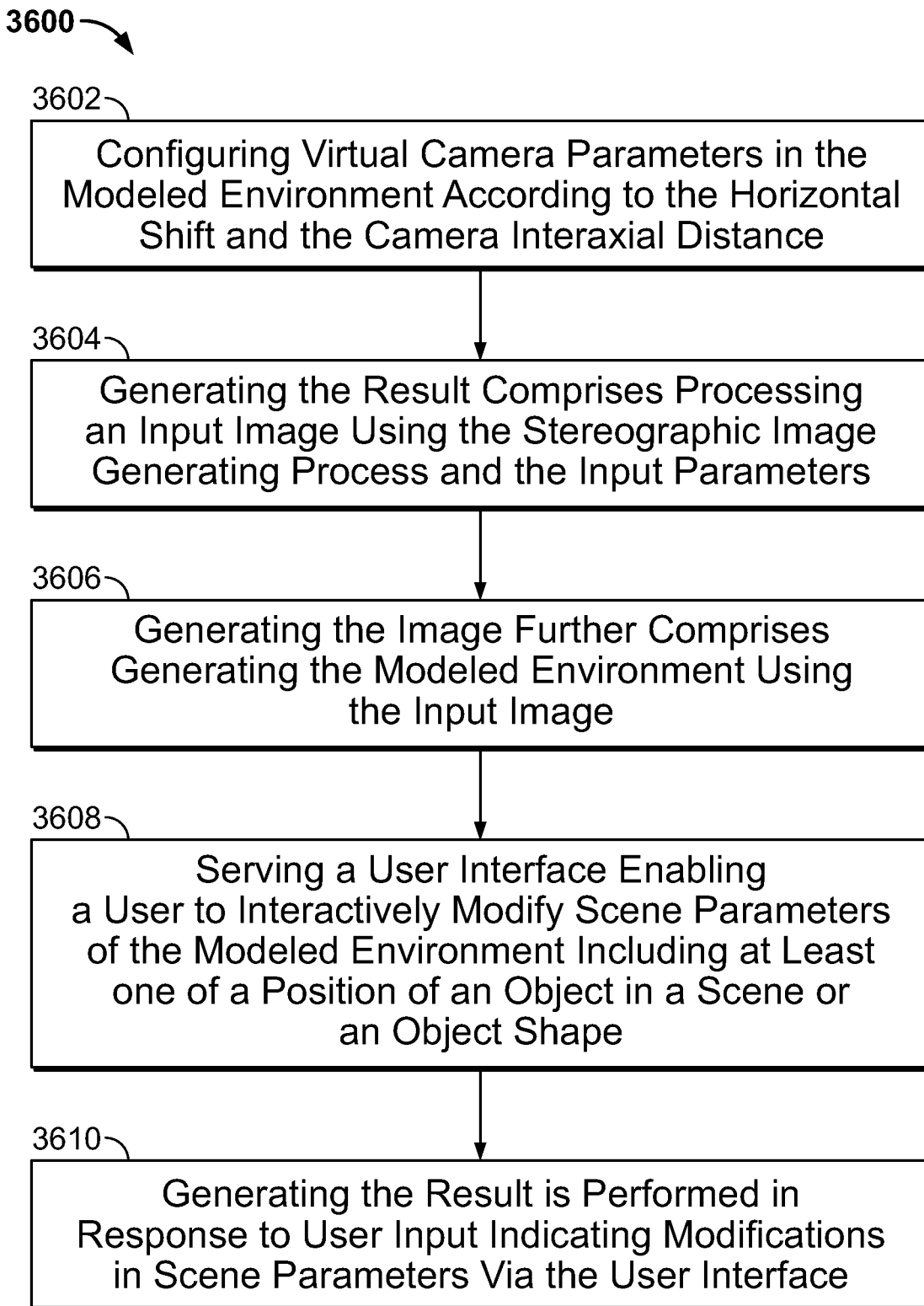

As noted, in some embodiments, the stereographic image generating process comprises stereographic rendering of a modeled environment, using as it were a pair of "virtual cameras," meaning a rendering process using modeled viewpoints and camera parameters in the modeled environment. Referring to FIG. 36, additional operations 3600 pertaining to stereography in a modeled environment are summarized. In such embodiments, the method 3200 may further include, at 3602, configuring virtual camera parameters in the modeled environment according to the horizontal shift and the camera interaxial distance. Generating the result in the method 3200 may further include, at 3604, processing an input image, e.g., a frame of digital video data, using the stereographic image generating process and the input parameters to render the image. In addition, generating the image in the method 3200 may further include, at 3606, generating the modeled environment using the input image. For example, one or more images of a real set may be used to construct a virtual model of the set in a computer memory. Then, a stereographic rendering process may be used to render the image from the modeled environment.

In other aspects, the method 3200 may further include, at 3608, serving a user interface enabling a user to interactively modify scene parameters of the modeled environment including at least one of a position of an object in a scene or an object shape. For example, a stereographic rendering process may include, or be used with, a model editing interface. In some embodiments, generating the result in the method 3200 may be performed in response to user input indicating modifications in scene parameters via the user interface, as shown at 3610.

Figure 37:
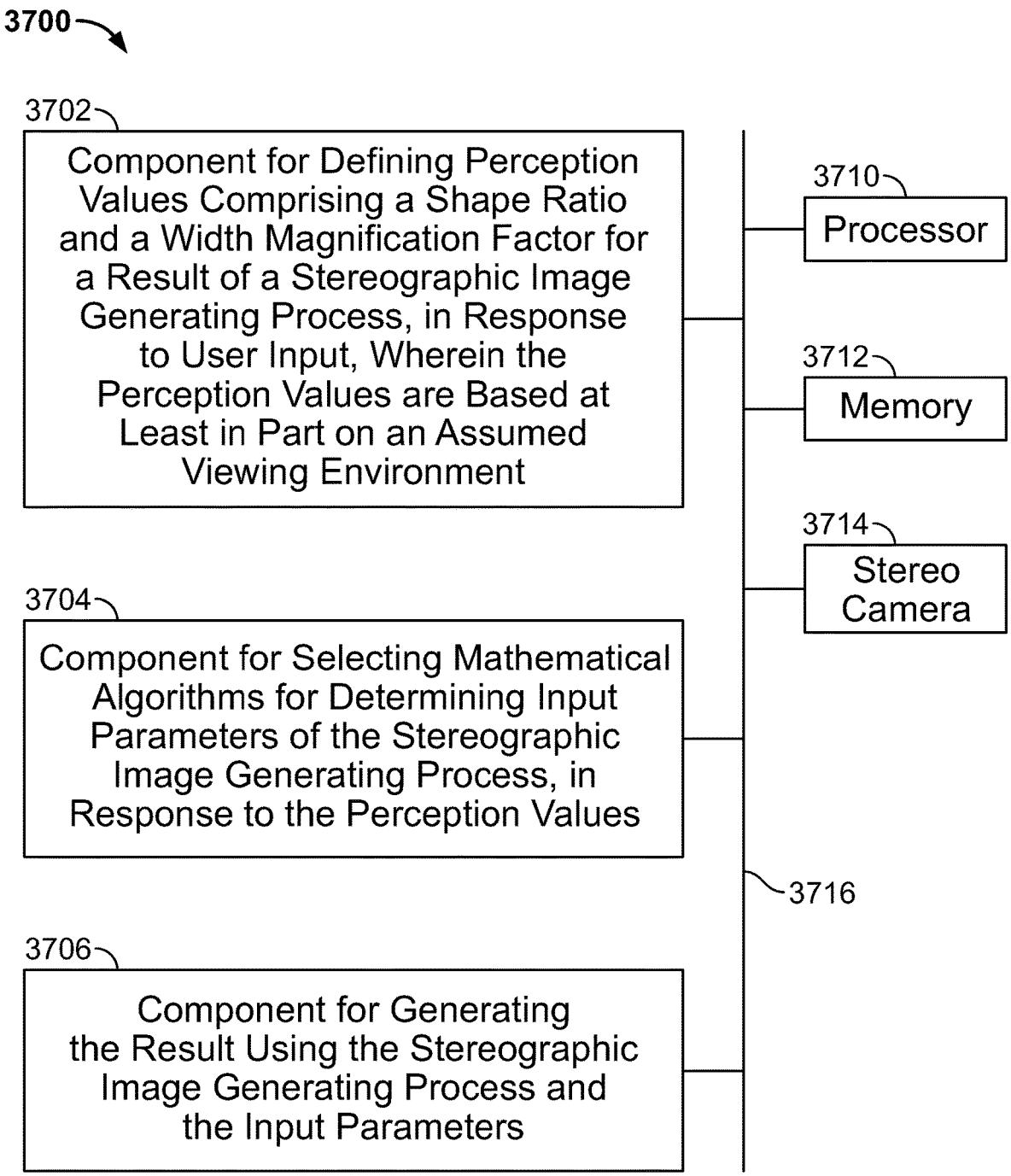
FIG. 37 is a block diagram illustrating aspects of an apparatus for controlling scene, camera and viewing parameters for altering perception of 3D imagery.

With reference to FIG. 37, there is provided an exemplary apparatus 3700 that may be configured as computer server, for example like system 3100. The apparatus 3700 may include functional blocks that can represent functions implemented by a processor, software, or combination thereof (e.g., firmware).

As illustrated, in one embodiment, the apparatus 3700 may include an electrical component or means 3702 for defining perception values comprising a shape ratio and a width magnification factor for a result of a stereographic image generating process, in response to user input, wherein the perception values are based at least in part on an assumed viewing environment. For example, the electrical component or means 3702 may include at least one control processor 3710 coupled to a memory component 3712. The control processor may operate an algorithm, which may be held as program instructions in the memory component. The algorithm may include, for example, receiving user input, processing the user input to determine an assumed viewing environment, and then looking up values for the shape ratio and width magnification factor based at least in part on the assumed viewing environment.

The apparatus 3700 may further include an electrical component or module 3704 for selecting mathematical algorithms for determining input parameters of the stereographic image generating process, in response to the perception values. For example, the electrical component or means 3704 may include at least one control processor 3710 coupled to a memory component 3712. The control processor may operate an algorithm, which may be held as program instructions in the memory component. The algorithm may include, for example, one or more of the algorithms for determining input parameters in response to perception values as provided herein above, for example in connection with Example-1 and Example-2.

The apparatus 3700 may further include an electrical component or module 3706 for generating the result using the stereographic image generating process and the input parameters. For example, the electrical component or means 3706 may include at least one control processor 3710 coupled to a memory component 3712. The control processor may operate an algorithm, which may be held as program instructions in the memory component. The algorithm may include, for example, providing the input parameters to operator of a pair of stereographic cameras, configuring the cameras according to the input parameters, and capturing a scene using the cameras configured with the input parameters. In alternative embodiments, the algorithm may include, for example, rendering a modeled environment in a computer memory using the input parameters to control rendering from stereographic viewpoints.

The apparatus 3700 may include similar electrical components for performing any or all of the additional operations 3300-3600 described in connection with FIGS. 33-36, which for illustrative simplicity are not shown in FIG. 37.

In related aspects, the apparatus 3700 may optionally include a processor component 3710 having at least one processor, in the case of the apparatus 3700 configured as computer. The processor 3710, in such case, may be in operative communication with the components 3702-3706 or similar components via a bus 3716 or similar communication coupling. The processor 3710 may effect initiation and scheduling of the processes or functions performed by electrical components 3702-3706.

In further related aspects, the apparatus 3700 may include a stereo camera component 3714 enabling capturing images of a real scene or rendering an image of a modeled (virtual) scene. The apparatus 3700 may optionally include a component for storing information, such as, for example, a memory device/component 3712. The computer readable medium or the memory component 3712 may be operatively coupled to the other components of the apparatus 3700 via the bus 3716 or the like. The memory component 3712 may be adapted to store computer readable instructions and data for implementing the processes and behavior of the components 3702-3706, and subcomponents thereof, or the processor 3710, or the methods disclosed herein. The memory component 3712 may retain instructions for executing functions associated with the components 3702-3706. While shown as being external to the memory 3712, it is to be understood that the components 3702-3706 can exist within the memory 3712.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that some illustrative logical blocks, modules, circuits, and algorithm steps described in connection with the embodiments disclosed herein may be implemented using electronic hardware, computer software, or combinations of both. To clearly illustrate this interchangeability of hardware and software, various illustrative components, blocks, modules, circuits, and steps have been described above generally in terms of their functionality. Whether such functionality is implemented using hardware or software depends upon the application and design constraints imposed on the overall system. Skilled artisans may implement the described functionality in varying ways for each application, but such implementation decisions should not be interpreted as causing a departure from the scope of the present disclosure.

For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for stereography, comprising:
defining, by at least one processor, perception values comprising a three-dimensional (3D) shape ratio and a 3D width magnification factor for a result of a stereographic image generating process based at least in part on parameters of an assumed viewing environment of a display on a screen, wherein the 3D width magnification is a ratio between perceived 3D image width to original object width, the 3D shape ratio is a ratio between 3D depth magnification and the 3D width magnification, and the 3D depth magnification is a ratio of change in perceived depth of the image to the change in the original object depth;
selecting, by the at least one processor, mathematical algorithms for generating input parameters of the stereographic image generating process based on the perception values; and generating the result using the stereographic image generating process and the input parameters.

2. The method of claim 1, further comprising determining, based in part on a screen size parameter, the three-dimensional (3D) magnification factor defined by the ratio of perceived size of a scene object in a 3D stereographic image on a display to an actual width of the scene object in an actual or virtual scene from which the 3D stereographic image is generated, wherein the perceived size of the scene object is a distance between the edges of the scene object displayed on the screen as would be perceived by the assumed observer; and wherein selecting the mathematical algorithms for the generating input parameters is further based on maintaining constant at least one of the 3D magnification factor or a factor derived from the 3D magnification factor.

3. The method of claim 1, wherein the parameters of the assumed viewing process further comprise a perceived x-coordinate '$X_i$' of an object image displayed on the screen, a perceived z-coordinate '$Z_i$' of the image of the object, and a screen parallax 'P' representing a distance between homologous points on the 3D viewing screen along a coordinate axis of the screen.

4. The method of claim 1, wherein the stereographic image generating process comprises capture of a real set using a stereographic camera rig configuring a pair of cameras for imaging the real set according to a horizontal shift 'h' and a camera interaxial distance 'T'.

5. The method of claim 1, wherein selecting the mathematical algorithms comprises selecting e/2M for horizontal shift and (C*e)/(f*M) for camera interaxial distance, wherein 'e' is eye separation between eyes of an observer perceiving an object image displayed on the screen, 'M' is a ratio of a screen size parameter to a corresponding image sensor size parameter, 'C' is convergence distance, and 'f' is lens focal length.

6. The method of claim 1, wherein selecting the mathematical algorithms comprises selecting of/2V for horizontal shift and Ce/V for camera interaxial distance, wherein 'e' is eye separation between eyes of an observer perceiving an object image displayed on the screen, T is lens focal length, 'V' is viewing distance, and 'C' is convergence distance.

7. The method of claim 1, wherein 'e' is eye separation between eyes of an observer perceiving an object image displayed on the screen, and selecting the mathematical algorithms comprises selecting 'e' for camera interaxial distance and (ef)/(2C) for the horizontal shift wherein 'f' is lens focal length and 'C' is convergence distance.

8. The method of claim 1, wherein selecting the mathematical algorithms comprises selecting t/2M for a horizontal shift, wherein 't' is a camera interaxial distance 't', 'M' is a ratio of a screen size parameter to a corresponding image sensor size parameter; and further comprising using a user-selected value for a camera interaxial distance and setting a fixed convergence distance equal to Mf, wherein 'f' is lens focal length.

9. The method of claim 1, wherein selecting the mathematical algorithms comprises selecting 2Mh for a camera interaxial distance, wherein 'h' is a horizontal shift, 'M' is a ratio of a screen size parameter to a corresponding image sensor size parameter; and further comprising using a user-selected value for a horizontal shift and setting a fixed convergence distance equal to Mf, wherein 'f' is lens focal length.

10. The method of claim 1, wherein the stereographic image generating process comprises stereographic rendering of a modeled environment, further comprising configuring virtual camera parameters in the modeled environment according to a horizontal shift and a camera interaxial distance, and generating stereographic image pairs by rendering the modeled environment using the virtual camera parameters.

11. An apparatus comprising a processor coupled to a stereographic camera input and to a memory, wherein the memory holds program instructions for execution by the processor to cause the apparatus to perform the operations of:

defining perception values comprising a three-dimensional (3D) shape ratio and a 3D width magnification factor for a result of a stereographic image generating process based at least in part on parameters of an assumed viewing environment of a display on a screen, wherein the 3D width magnification is a ratio between perceived 3D image width to original object width, the 3D shape ratio is a ratio between 3D depth magnification and the 3D width magnification, and the 3D depth magnification is a ratio of change in perceived depth of the image to the change in the original object depth;

selecting mathematical algorithms for generating input parameters of the stereographic image generating process based on the perception values; and generating the result using the stereographic image generating process and the input parameters.

12. The apparatus of claim 11, wherein the memory holds further instructions for determining, based in part on a screen size parameter, the three-dimensional (3D) magnification factor defined by the ratio of perceived size of a scene object in a 3D stereographic image on a display to an actual width of the scene object in an actual or virtual scene from which the 3D stereographic image is generated, wherein the perceived size of the scene object is a distance between the edges of the scene object displayed on the screen as would be perceived by the assumed observer; and wherein selecting the mathematical algorithms for the generating input parameters is further based on maintaining constant at least one of the 3D magnification factor or a factor derived from the 3D magnification factor.

13. The apparatus of claim 11, wherein the memory holds further instructions for defining the perception value based on parameters of the assumed viewing process comprising a perceived x-coordinate '$X_i$' of an object image displayed on the screen, a perceived z-coordinate '$Z_i$' of the image of the object, and a screen parallax 'P' representing a distance between homologous points on the 3D viewing screen along a coordinate axis of the screen.

14. The apparatus of claim 11, wherein the memory holds further instructions for selecting the mathematical algorithms at least in part by selecting e/2M for horizontal shift and (C*e)/(f*M) for camera interaxial distance, wherein 'e' is eye separation between eyes of an observer perceiving an object image displayed on the screen, 'M' is a ratio of the screen size parameter to a corresponding image sensor size parameter, 'C' is convergence distance, and 'f' is lens focal length.

15. The apparatus of claim 11, wherein the memory holds further instructions for selecting the mathematical algorithms at least in part by selecting of/2V for horizontal shift and Ce/V for camera interaxial distance, wherein 'e' is eye separation between eyes of an observer perceiving an object image displayed on the screen, 'f' is lens focal length, 'V' is viewing distance, and 'C' is convergence distance.

16. The apparatus of claim 11, wherein the memory holds further instructions for selecting the mathematical algorithms at least in part by selecting 'e' for the camera interaxial distance and (ef)/(2C) for the horizontal shift, wherein 'e' is eye separation between eyes of an observer perceiving an object image displayed on the screen, 'f' is lens focal length, and 'C' is convergence distance.

17. The apparatus of claim 11, wherein the memory holds further instructions for selecting the mathematical algorithms at least in part by selecting t/2M for a horizontal shift, wherein 'M' is a ratio of the screen size parameter to a corresponding image sensor size parameter and 't' is a camera interaxial distance; and further comprising using a user-selected value for a camera interaxial distance and setting a fixed convergence distance equal to Mf, wherein 'f' is lens focal length.

18. The apparatus of claim 11, wherein the memory holds further instructions for selecting the mathematical algorithms at least in part by selecting 2Mh for a camera interaxial distance, wherein 'M' is a ratio of the screen size parameter to a corresponding image sensor size parameter and 'h' is a horizontal shift; and further comprising using a user-selected value for the horizontal shift and setting a fixed convergence distance equal to Mf, wherein 'f' is lens focal length.

19. The apparatus of claim 11, wherein the stereographic image generating process comprises stereographic rendering of a modeled environment, and wherein the memory holds further instructions for configuring virtual camera parameters in the modeled environment according to a horizontal shift and a camera interaxial distance, and generating stereographic image pairs by rendering the modeled environment using the virtual camera parameters.

20. A non-transitory computer-readable medium encoded with instructions that when executed by a processor, cause a computer to perform:

defining perception values comprising a three-dimensional (3D) shape ratio and a 3D width magnification factor for a result of a stereographic image generating process based at least in part on parameters of an assumed viewing environment of a display on a screen, wherein the 3D width magnification is a ratio between perceived 3D image width to original object width, the 3D shape ratio is a ratio between 3D depth magnification and the 3D width magnification, and the 3D depth magnification is a ratio of change in perceived depth of the image to the change in the original object depth;

selecting mathematical algorithms for generating input parameters of the stereographic image generating process based on the perception values; and generating the result using the stereographic image generating process and the input parameters.

* * * * *